US010793276B2

(12) United States Patent
Radacovici et al.

(10) Patent No.: US 10,793,276 B2
(45) Date of Patent: Oct. 6, 2020

(54) CLASS DIVIDER FOR AN AIRCRAFT PASSENGER CABIN

(71) Applicant: BOMBARDIER INC., Dorval (CA)

(72) Inventors: Lili-Mei Radacovici, Saint-Jerome (CA); Vincent Beaumont, Montreal (CA); Michael Block, Cote St-Luc (CA); Robert Grant, Toronto (CA)

(73) Assignee: C SERIES AIRCRAFT LIMITED PARTNERSHIP, Mirabel (CA)

( * ) Notice: Subject to any disclaimer, the term of this patent is extended or adjusted under 35 U.S.C. 154(b) by 156 days.

(21) Appl. No.: 15/768,230

(22) PCT Filed: Oct. 17, 2016

(86) PCT No.: PCT/IB2016/056222
§ 371 (c)(1),
(2) Date: Apr. 13, 2018

(87) PCT Pub. No.: WO2017/068484
PCT Pub. Date: Apr. 27, 2017

(65) Prior Publication Data
US 2018/0346124 A1   Dec. 6, 2018

Related U.S. Application Data

(60) Provisional application No. 62/245,613, filed on Oct. 23, 2015.

(51) Int. Cl.
*B64D 11/00* (2006.01)
(52) U.S. Cl.
CPC ........ *B64D 11/0023* (2013.01); *B64D 11/003* (2013.01)

(58) Field of Classification Search
CPC .. B64D 11/003; B64D 11/0023; B64D 31/00; B61D 37/00; B61D 37/003
See application file for complete search history.

(56) References Cited

U.S. PATENT DOCUMENTS

| 6,523,779 | B1 | 2/2003 | Michel |
| 7,530,529 | B2 | 5/2009 | Bock |
| 9,108,734 | B2 | 8/2015 | Chandler |
| 9,139,301 | B2 | 9/2015 | Slyter et al. |
| 2014/0158310 | A1* | 6/2014 | Slyter ................ B64D 11/0023 160/124 |

(Continued)

FOREIGN PATENT DOCUMENTS

| EP | 1910165 B1 | 4/2008 |
| WO | 9938771 A1 | 8/1999 |

OTHER PUBLICATIONS

PCT International Search Report and Written Opinion dated Mar. 21, 2017 re: International Application No. PCT/IB2016/056222.

(Continued)

*Primary Examiner* — Richard G Davis
(74) *Attorney, Agent, or Firm* — Norton Rose Fulbright Canada LLP

(57) ABSTRACT

Class dividers for aircraft passenger cabins comprising pivoting luggage bins (20) are disclosed. The class divider comprises a curtain (24B) mounted inside the passenger cabin to extend into a space allotted for movement of the pivoting luggage bin. The curtain (24B) is resiliently deformable to accommodate the movement of the pivoting luggage bin (20).

30 Claims, 19 Drawing Sheets

(56) References Cited

U.S. PATENT DOCUMENTS

2015/0284084 A1 10/2015 Mayer
2016/0059964 A1* 3/2016 Breuer ................ B64D 11/003
                                                        244/118.5

OTHER PUBLICATIONS

English translation of International Publication No. WO 99/38771 dated Aug. 5, 1999, https://patents.google.com/patent/WO1999038771A1/en?oq=WO9938771, accessed on Mar. 26, 2018.
English translation of European patent document No. EP1910165 dated Apr. 16, 2008, https://patents.google.com/patent/EP1910165B1/en, accessed on Apr. 4, 2018.

* cited by examiner

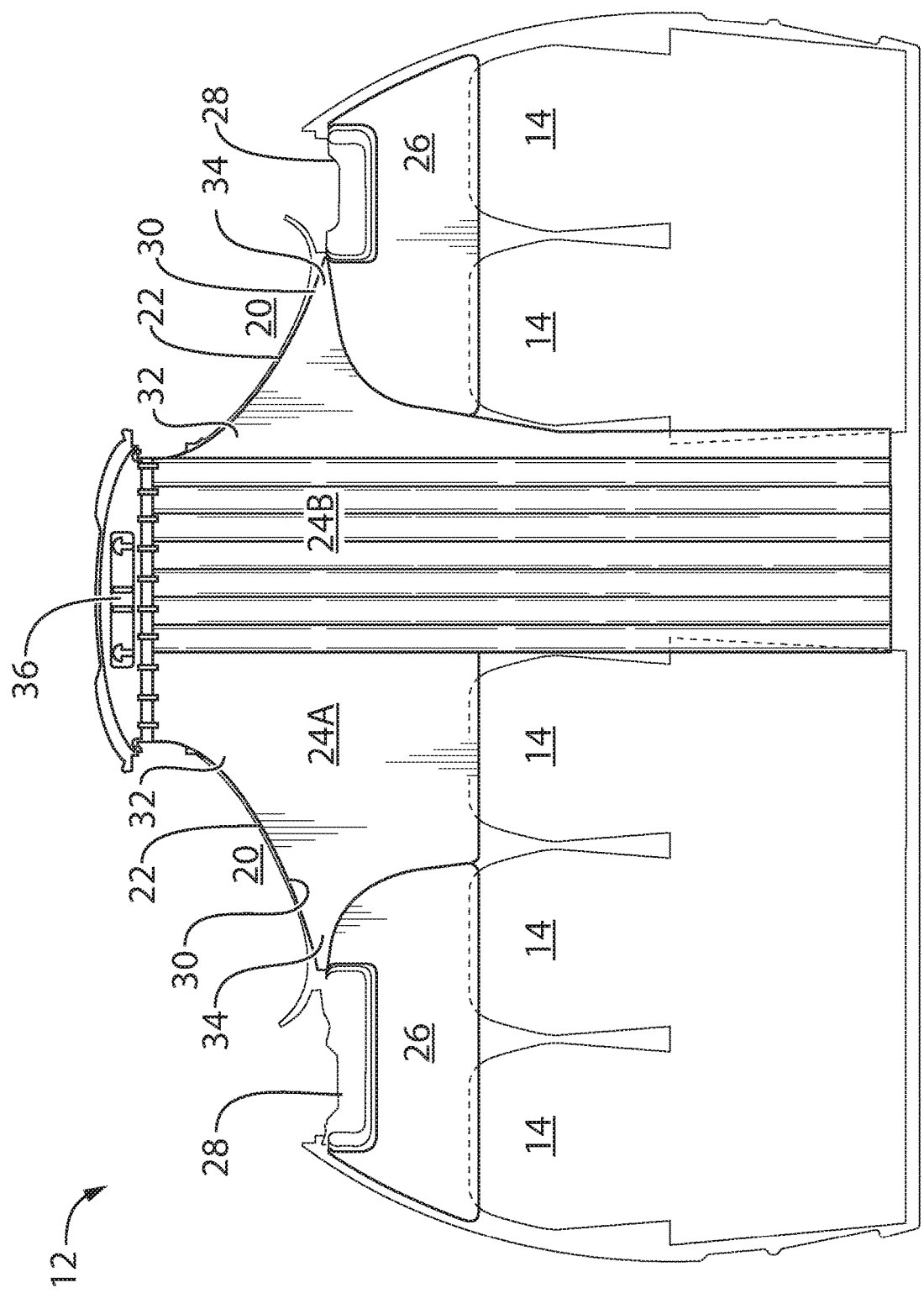

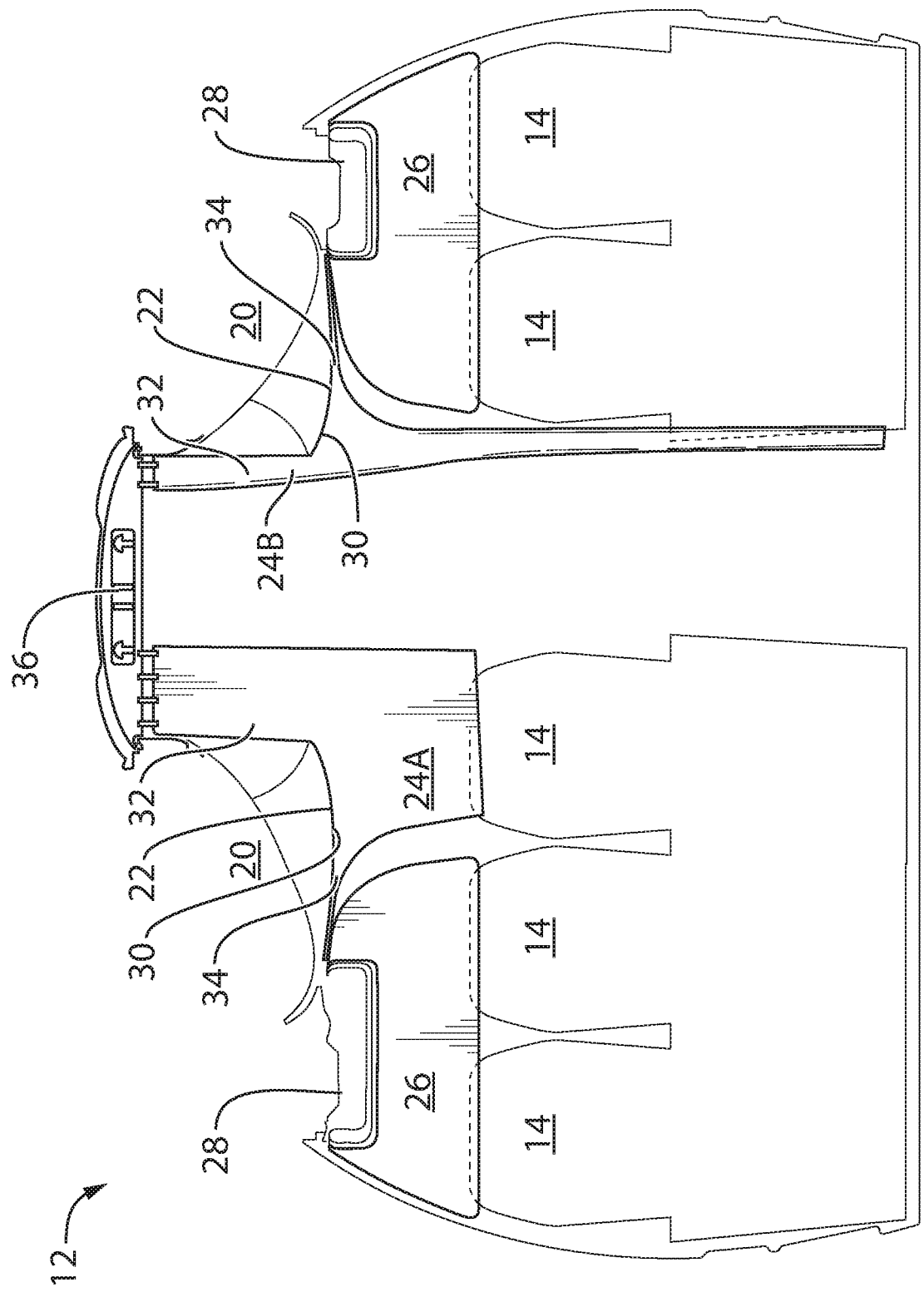

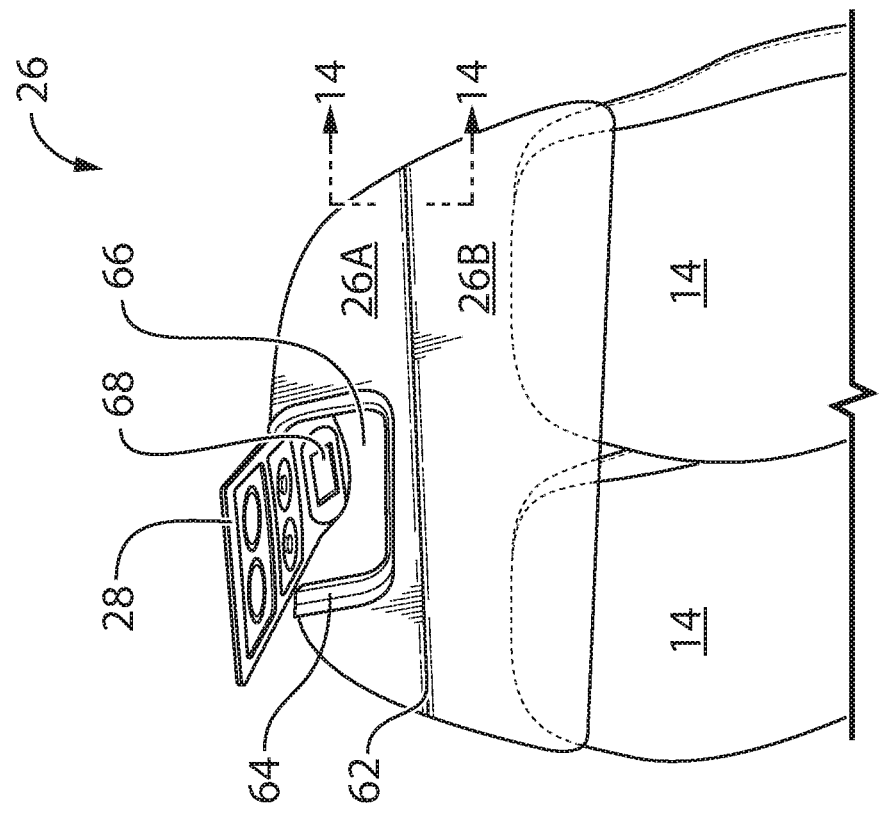
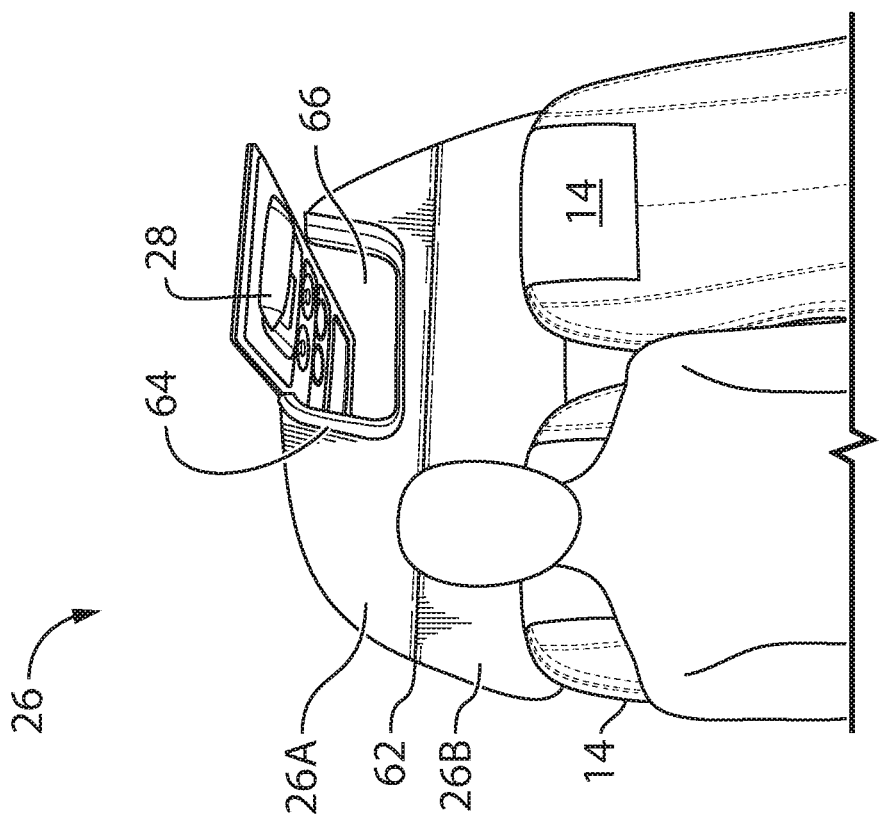
FIG. 12A
FIG. 12B

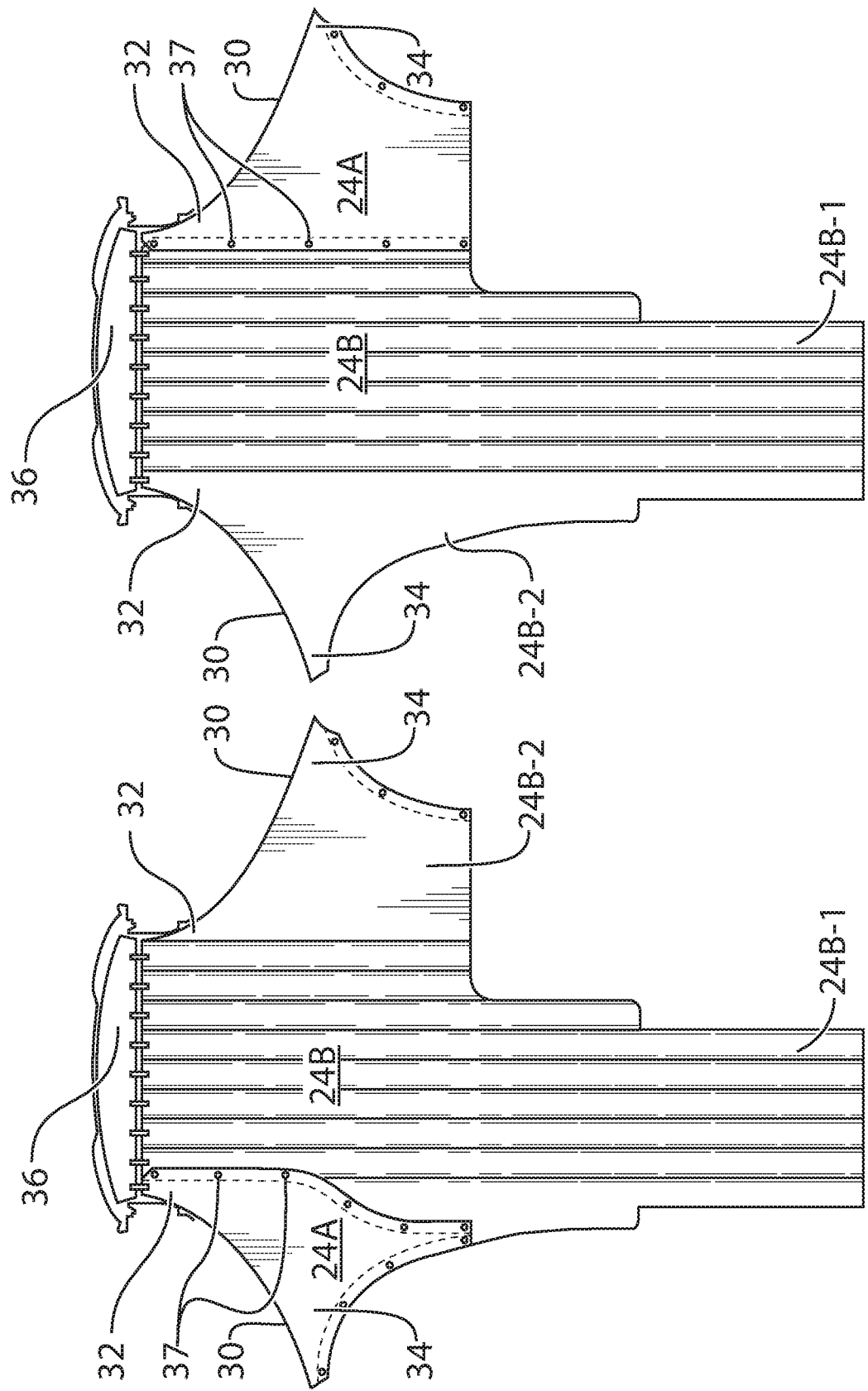

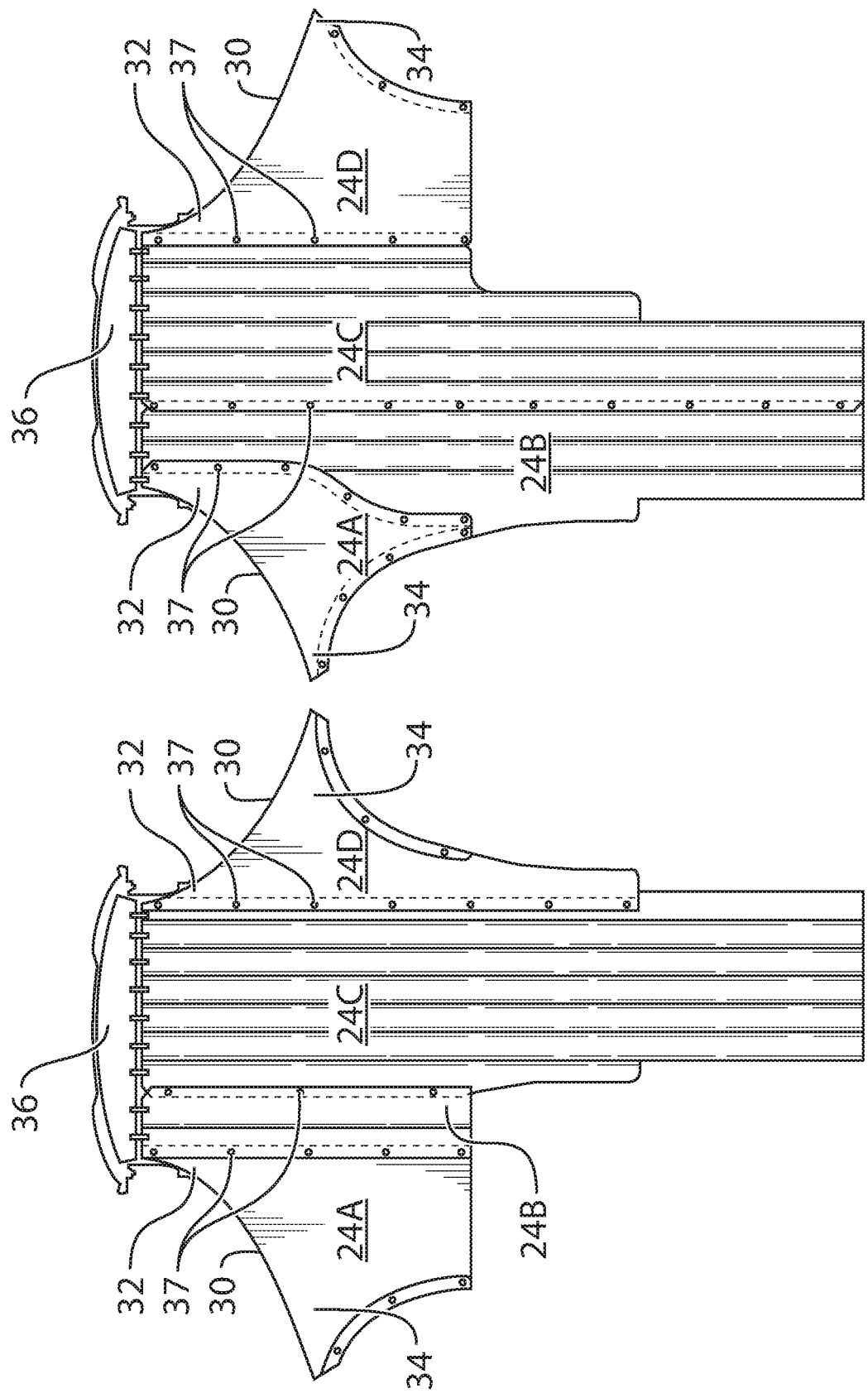

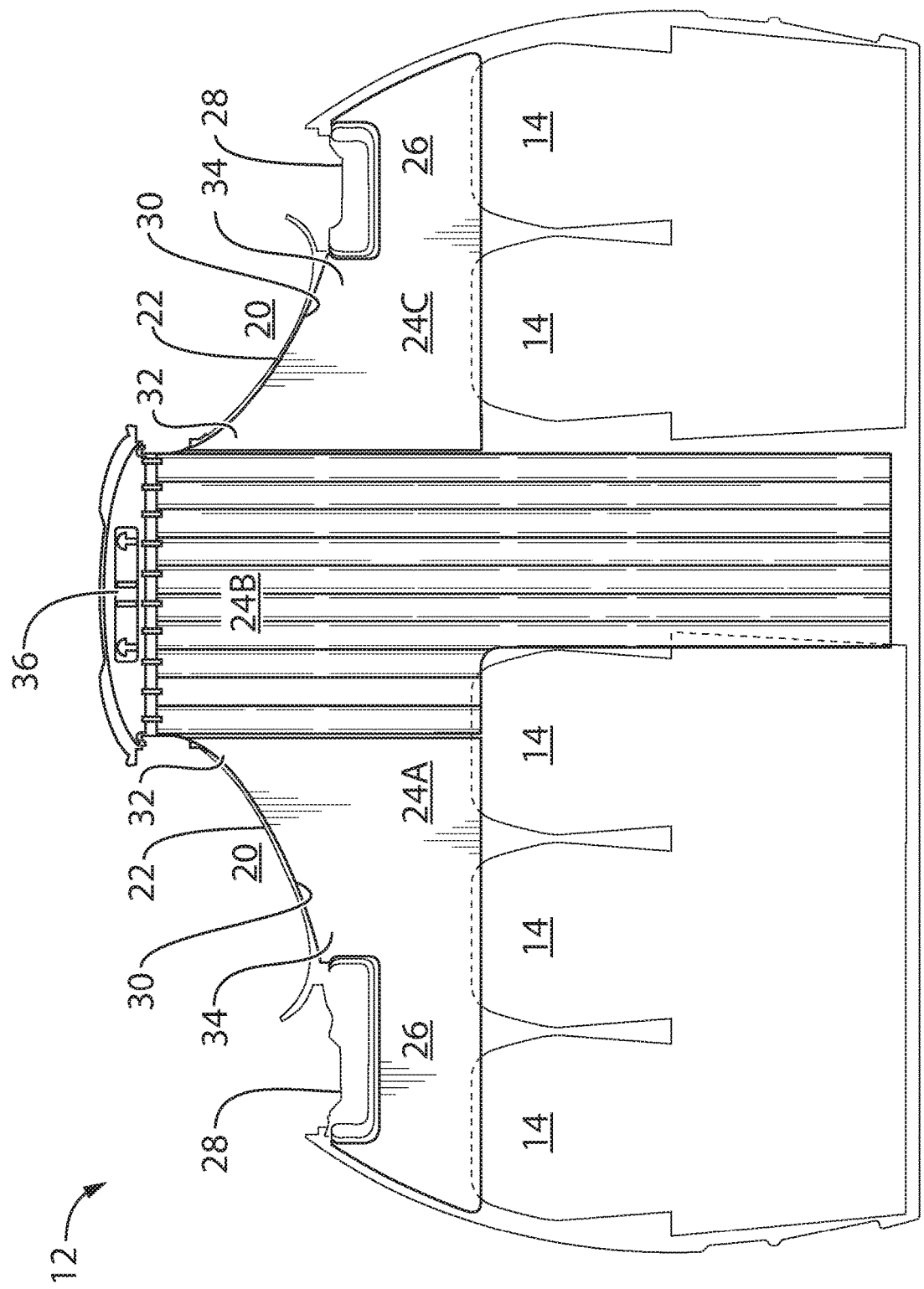

CLASS DIVIDER FOR AN AIRCRAFT PASSENGER CABIN

CROSS-REFERENCE TO RELATED APPLICATION(S)

The present application is a national phase application under 35 U.S.C. 371 of International Patent Application No. PCT/IB2016/056222 filed on Oct. 17, 2016, which claims priority from U.S. Provisional Patent Application Ser. No. 62/245,613 filed on Oct. 23, 2015, the entire content of which is incorporated herein by reference.

TECHNICAL FIELD

The disclosure relates generally to class dividers in passenger cabins of mobile platforms, and more particularly to movable class dividers for use in passenger cabins with pivoting luggage bins.

BACKGROUND OF THE ART

Partitions/dividers are often used in an airliner's passenger cabin to separate the cabin into two or more zones corresponding to, for example, a business class and an economy class. Existing dividers are often installed in a passenger cabin in a somewhat permanent manner with the intention that they will be moved infrequently or that they will not be moved. Accordingly, moving those existing dividers for the purpose of changing the sizes of the zones within the passenger cabin requires the involvement of aircraft maintenance personnel. Some existing dividers also do not provide complete visual separation between the two zones. For example, some dividers have clearance gaps that allow for opening of luggage bins within the passenger cabin and such clearance gaps reduce the amount of visual separation provided by those dividers. Improvement is desirable.

SUMMARY

In one aspect, the disclosure describes a passenger cabin of a mobile platform. The passenger cabin comprises;

a pivoting luggage bin disposed inside the passenger cabin and above a passenger seat, the pivoting luggage bin being movable from a closed position to an open position through an allotted space inside the passenger cabin; and a divider at least partially separating two zones inside the passenger cabin, the divider comprising a curtain mounted inside the passenger cabin and extending into the space allotted for movement of the pivoting luggage bin, the curtain being resiliently deformable to accommodate the movement of the pivoting luggage bin.

The curtain may comprise an inboard portion attached to an inboard structure inside the cabin and an outboard portion elastically attached to an outboard structure inside the cabin. The inboard structure may comprise an aisle header. The aisle header may be configured to be movable along an aisle of the passenger cabin.

The passenger cabin may comprise an elastic strap attaching the curtain to the outboard structure inside the cabin.

An edge of the curtain may be biased against a face of the pivoting luggage bin. The curtain may comprise a channel extending along the edge of the curtain. An elastic strap may extend into the channel. A first end of the elastic strap may be attached to the curtain. A second end of the elastic strap may be elastically movable relative to the first end and may be attached to a structure inside the cabin.

The divider may comprises a close-out panel extending at least partially between a passenger service unit disposed above the passenger seat and the passenger seat. The close-out panel may comprise a frame defining a viewing window through the close-out panel.

The curtain may be elastically attached to the frame of the close-out panel.

The close-out panel may comprise a first panel portion and a second panel portion. The second panel portion may be pivotable relative to the first panel portion.

The second panel portion may be configured to engage the passenger seat so that movement of the passenger seat causes movement of the second panel portion relative to the first panel portion.

Each of the first panel portion and the second panel portion may comprise a core and a cover. One or more stitches in the close-out panel may define a hinge between the first panel portion and the second panel portion.

The first panel portion and the second panel portion may comprise a common foam core.

The passenger cabin may comprise a fastener for releasably fastening the curtain to the close-out panel when the pivoting bin is closed. The fastener may comprise a magnet.

The close-out panel may be configured to be attached to and detached from the passenger service unit without the use of tools.

In another aspect, the disclosure describes a passenger cabin of a mobile platform. The passenger cabin comprises:

a pivoting luggage bin disposed inside the passenger cabin, the pivoting luggage bin being movable from a closed position to an open position through an allotted space inside the passenger cabin; and a curtain at least partially separating two zones inside the passenger cabin, the curtain being mounted inside the passenger cabin and extending into the space allotted for movement of the pivoting luggage bin, the curtain being deformable from a first shape where the luggage bin is in the closed position to a second shape where the movement of the pivoting luggage bin is accommodated by the curtain, the curtain being biased toward the first shape.

In another aspect, the disclosure describes an aircraft comprising a passenger cabin as described herein.

In another aspect, the disclosure describes a divider for at least partially separating two zones inside a passenger cabin of a mobile platform where the passenger cabin comprises a pivoting luggage bin disposed inside the passenger cabin and above a passenger seat, the pivoting luggage bin being movable from a closed position to an open position through an allotted space inside the passenger cabin, the divider comprising:

a curtain configured to be mounted inside the passenger cabin and to extend into the space allotted for movement of the pivoting luggage bin, the curtain comprising an edge configured to be biased against a face of the pivoting luggage bin; and a biasing member attached to the curtain and configured to facilitate resilient deformation of the curtain to accommodate the movement of the pivoting luggage bin.

The curtain may comprise an inboard portion for attachment to an inboard structure inside the cabin and an outboard portion for elastic attachment to an outboard structure inside the cabin via the biasing member.

The biasing member may comprise an elastic strap.

The curtain may comprise a channel extending along the edge of the curtain. The elastic strap may extend into the channel. A first end of the elastic strap may be attached to the curtain. A second end of the elastic strap may be elastically movable relative to the first end.

The divider may comprise a close-out panel configured to extend at least partially between a passenger service unit disposed above the passenger seat and the passenger seat. The close-out panel may comprise a frame defining a viewing window through the close-out panel.

The divider may comprise an interface for attaching the biasing member to the frame of the close-out panel.

The close-out panel may comprise a first panel portion and a second panel portion. The second panel portion may be pivotally connected to the first panel portion.

The second panel portion may be configured to engage the passenger seat so that movement of the passenger seat causes movement of the second panel portion relative to the first panel portion.

Each of the first panel portion and the second panel portion may comprises a core and a cover where one or more stitches applied to the close-out panel define a hinge between the first panel portion and the second panel portion.

The first panel portion and the second panel portion may comprise a common foam core.

The divider may comprise a fastener for releasably fastening the curtain to the close-out panel when the pivoting bin is closed. The fastener may comprise a magnet.

In another aspect, the disclosure describes an aircraft comprising a divider as described herein.

In another aspect, the disclosure describes a close-out panel for extending at least partially between a passenger service unit disposed above a passenger seat inside a passenger cabin of a mobile platform and the passenger seat. The close-out panel comprises:

a first panel portion; and a second panel portion pivotally connected to the first panel portion, the second panel portion being configured to engage the passenger seat so that movement of the passenger seat causes movement of the second panel portion relative to the first panel portion.

The close-out panel may comprise a frame defining a viewing window through the first panel portion.

The close-out panel may comprise at least part of an interface for attaching a curtain to the frame.

Each of the first panel portion and the second panel portion may comprise a core and a cover where one or more stitches applied to the close-out panel define a hinge between the first panel portion and the second panel portion.

The first panel portion and the second panel portion may comprise a common foam core.

The close-out panel may be configured to be attached to and detached from the passenger service unit without the use of tools.

In another aspect, the disclosure describes an aircraft comprising a close-out panel as described herein.

Further details of these and other aspects of the subject matter of this application will be apparent from the detailed description and drawings included below.

DESCRIPTION OF THE DRAWINGS

Reference is now made to the accompanying drawings, in which:

FIGS. 4A and 4B respectively show the class divider of FIG. 3 in a first configuration where the pivoting luggage bins are closed and in a second configuration where the pivoting luggage bins are open;

FIGS. 12A and 12B respectively show a perspective front and perspective rear view of an exemplary close-out panel of the divider of FIG. 3;

FIGS. 20-24 are front elevation views of various exemplary embodiments of curtains which may be suitable for use with the divider of FIG. 3; and FIGS. 25A and 25B respectively show another exemplary class divider in a first configuration where the luggage bins are closed and in a second configuration where the luggage bins are open.

DETAILED DESCRIPTION

The present disclosure relates to dividers for passenger cabins of mobile platforms such as aircraft, trains and busses for example. In various embodiments, the dividers disclosed herein may be readily movable to a new location with the passenger cabin so as to accommodate varying passenger loads aboard the mobile platform and consequently allow the size of two zones (e.g., business class and economy class) within the passenger cabin to be readily modified based on passenger load. In various embodiments, the dividers disclosed here may improve visual separation between zones of passenger cabins that have pivoting luggage bins. In some embodiments, the dividers disclosed herein may provide visibility of ordinance signs or other notifications to passengers sitting immediately behind such dividers. In some embodiments, the dividers disclosed herein may provide surface area suitable for the display of branding colors and/or logo(s) of an operator of the mobile platform.

Aspects of various embodiments are described through reference to the drawings.

Figure 1:
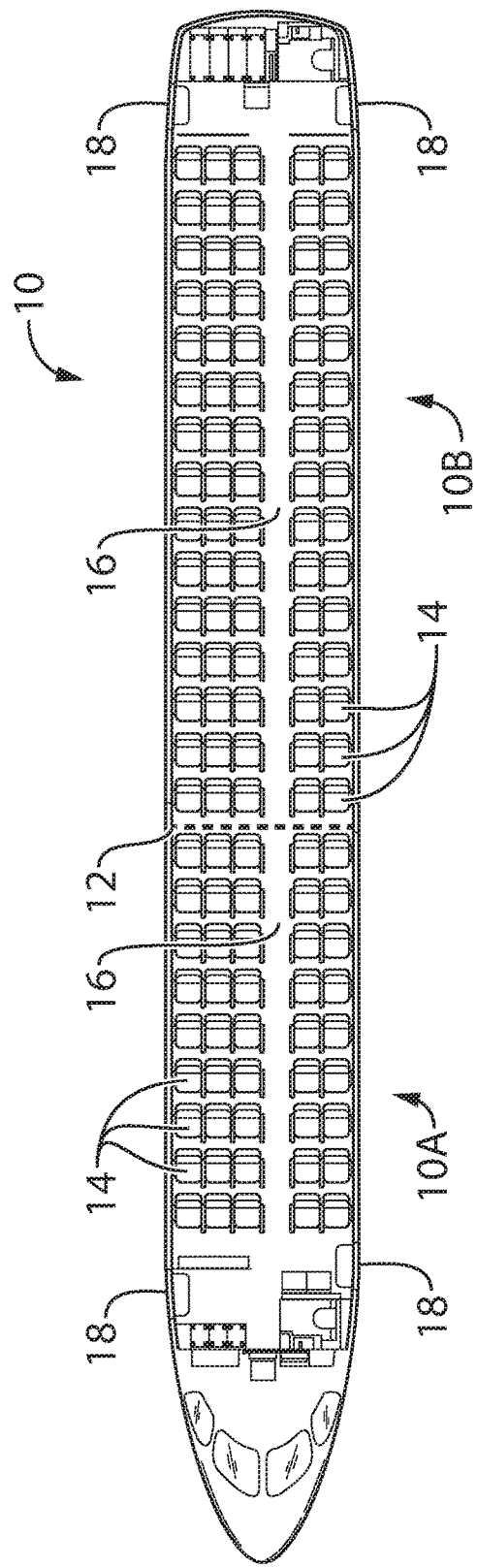
FIG. 1 shows a top plan view of an exemplary passenger cabin of an aircraft comprising a class divider.

FIG. 1 shows a top plan view of an exemplary passenger cabin 10 of a mobile platform where class divider 12 at least partially separates first zone 10A of passenger cabin 10 from second zone 10B of passenger cabin 10. For the purpose of illustration, FIG. 1 illustrates a representation of an aircraft cabin but it is understood that divider 12 as disclosed herein could also be used in passenger cabins of other types of mobile platforms such as trains or busses for example. In some embodiments, passenger cabin 10 shown in FIG. 1 may be that of a commercial aircraft. For example, passenger cabin 10 may be that of a narrow-body, twin engine jet airliner.

Passenger cabin 10 may comprise a plurality of passenger seats 14 arranged in a plurality of rows. Passenger cabin 10 may comprise aisle 16 extending along passenger cabin 10 and facilitating passenger and flight crew mobility between seats 14 and doors 18. In various embodiments, passenger cabin 10 may comprise a single aisle 16 or may comprise two or more aisles 16 and divider 12 may be adapted to such configurations of passenger cabins 10. In some embodiments, seats 14 located in zone 10A (e.g., business class) may have a different configuration (e.g., larger or have a larger seat pitch) so as to provide more passenger comfort than seats 14 located in zone 10B (e.g., economy class) of passenger cabin 10. Alternatively, seats 14 located in zone 10A may be configured substantially identically to seats 14 located in zone 10B where zones 10A and 10B may be differentiated by the service(s) provided (e.g., food, amenities) in each zone.

Accordingly, zones 10A and zones 10B of passenger cabin 10 may be re-configurable by way of repositioning divider 12 to adjust the respective sizes of zones 10A and 10B based on passenger load. For example, if a specific leg of a flight has a higher business class or economy class passenger count, the flight crew may be able to reposition divider 12 accordingly. Zone 10B may be disposed aft of zone 10A in passenger cabin 10. Divider 12 may extend transversely in passenger cabin 10 to at least partially separate zones 10A and zones 10B by providing some visual separation between zones 10A and 10B. Divider 12 may also allow for passenger and/or flight crew mobility between zones 10A and 10B along aisle 16.

Figure 2:
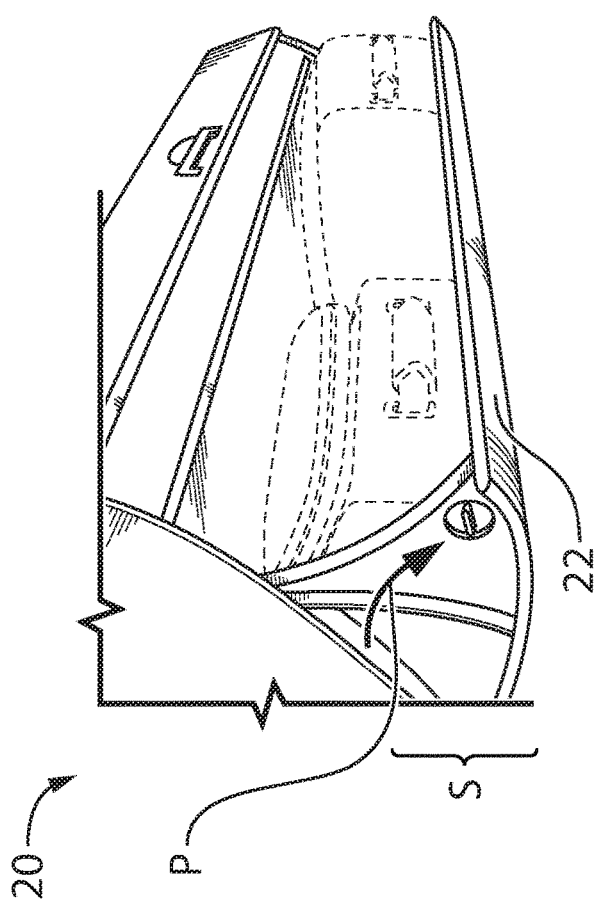
FIG. 2 is a perspective view of an exemplary pivoting luggage bin disposed inside the passenger cabin of FIG. 1.

FIG. 2 is a perspective view of an exemplary luggage bin 20 disposed inside passenger cabin 10 where luggage bin 20 is shown in an open position. For example, passenger cabin 10 may comprise one or more of such luggage bins 20, which may be disposed above seats 14. In some embodiments, passenger cabin 10 may comprise a plurality of luggage bins 20 disposed along aisle 16 of passenger cabin 10. Luggage bin(s) 20 may be of known or other types for storing passenger luggage therein. In some embodiments, luggage bin 20 may be of the pivoting bin/bucket type as shown in FIG. 2. For example, luggage bin 20 may be opened by way of a pivoting movement along arrow P. Accordingly, luggage bin 20 may comprise face 22 which may be movable (e.g., substantially downwardly) from a closed position to an open position as shown in FIG. 2 through an allotted space S inside passenger cabin 10. Alternatively, luggage bin 20 may be of the shelf and door type or of any known or other type which may comprise a component thereof such as a door that moves through some allotted space inside of passenger cabin 10 during opening and/or closing of luggage bin 20.

Figure 3:
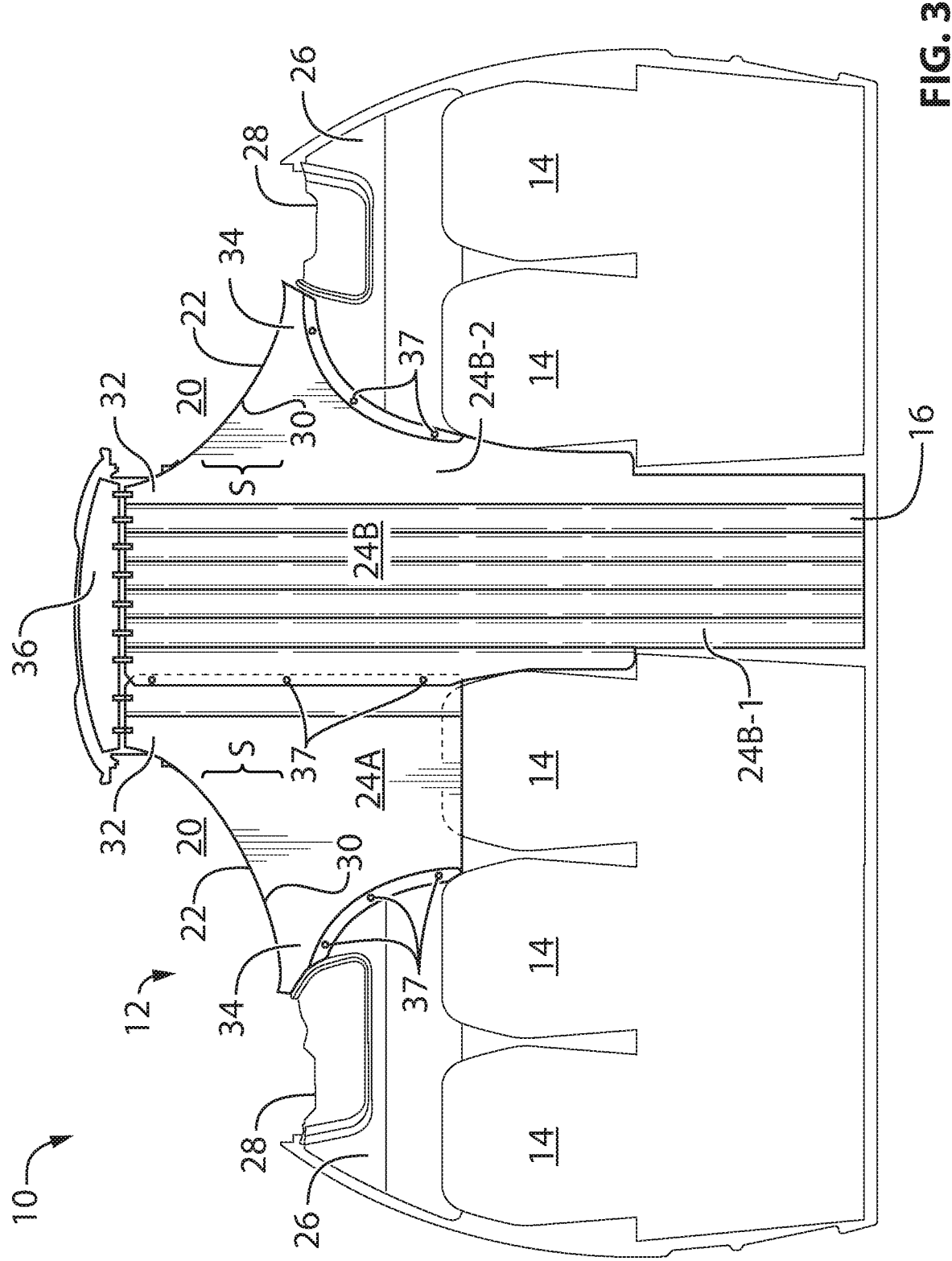
FIG. 3 is a transverse partial cross-section view of the passenger cabin of FIG. 1 showing a front plan view of the class divider of FIG. 1.

FIG. 3 is a transverse cross-section view of passenger cabin 10 of FIG. 1 showing a front plan view of divider 12 shown in FIG. 1 looking in a rearward direction from zone 10A. As shown in FIG. 3, divider 12 may at least partially separate zones 10A and 10B inside passenger cabin 10 by providing some visual separation between zones 10A and 10B. In various embodiments, divider 12 may comprise one or more curtains 24A, 24B (referred generally herein as "curtain 24") and, optionally, one or more close-out panels 26. Curtains 24A, 24B and close-out panel(s) 26 may be configured to extend substantially transversely inside passenger cabin 10 in order to provide visual separation between zones 10A, 10B. In some embodiments, curtains 24A, 24B may be disposed inboard relative to close-out panels 26. Accordingly, one or more of curtains 24A, 24B may serve to at least partially occlude aisle 16 and close-out panels 26 may serve to at least partially occlude a space between seats 14 and luggage bins 20. For example, close-out panels 26 may at least partially extend between passenger service units 28 and seats 14.

Curtains 24A, 24B may each be mounted in passenger cabin 10 and cooperatively provide separation between zones 10A, 10B. For example, curtains 24A, 24B may be mounted side by side and may each extend into a respective space S allotted for movement of a respective pivoting luggage bin 20. In some embodiments, curtain 24A and/or curtain 24B may be resiliently deformable to accommodate the movement of face 22 of the respective luggage bin 20. The manner in which curtains 24A, 24B may be resiliently deformable and the structural elements associated therewith may be substantially the same for both curtain 24A and curtain 24B therefore the explanation provided below is made in reference to curtain 24A only.

As referenced in the present disclosure, the resilient deformation of curtain 24A is intended to encompass the ability of curtain 24A to be flexibly (i.e., non-destructively) deformed and the ability to subsequently be caused to return substantially to its original shape after being deformed. The resilience of curtain 24A may, for example, be achieved through elastic attachment of curtain 24A to other (e.g., fixed) structure inside of passenger cabin 10 and/or through the use of elastic material as part of or the entirety of curtain 24A. For example, the use of an elastic connecting member (e.g., biasing member) for attaching curtain 24A to some other structure may permit the use of a non-resilient but flexible material for the construction curtain 24A so that the elastic connecting member may be caused to stretch by the deformation of curtain 24A due to the opening of luggage bin 20 and then pull curtain 24A back to its original shape during the closing of luggage bin 20. Alternatively or in addition, the use of elastic material (e.g., stretchy fabric) in the construction of curtain 24A may permit curtain 24A to be flexibly and elastically deformed by the opening and closing of luggage bin 20.

Curtains 24A and/or 24B may comprise any flexible material (e.g., fabric) suitable for finishing the interiors of aircraft and other mobile platforms. For example, in various embodiments, curtains 24A and/or 24B may be made of or comprise one or more materials from the following group: leather, vinyl and textile fabric(s) (e.g., natural or synthetic).

Such textile fabric(s) may comprise one or more materials from the following group: wool, polyester, cotton and/or silk. In some embodiments, curtains 24A and/or 24B may comprise a biasing member incorporated therein which may be made of or comprise a stretch fabric such as spandex, elastane or other suitable relatively elastic material(s). In various embodiments, curtains 24A and/or 24B may comprise a single or multiple fabric plies.

Curtain 24A may comprise edge 30 biased against face 22 of luggage bin 20 in order to improve visual separation provided by divider 12. Accordingly, due to the resilient deformation of curtain 24A, a clearance between curtain 24A and luggage bin 20 may not be required to permit the opening and closing of luggage bin 20. Curtain 24A may comprise inboard portion 32 attached to an inboard structure inside passenger cabin 10 and outboard portion 34 attached to an outboard structure inside passenger cabin 10. For example inboard portion 32 of curtain 24A may be attached to aisle header 36 and outboard portion 34 of curtain 24A may be attached to close-out panel 26. In various embodiments, curtain 24A may be elastically attached to aisle header 36 and/or curtain 24A may be elastically attached to close-out panel 26 via a suitable biasing member as described further below so as to accommodate the opening and closing of pivoting bin 20.

Divider 12 may also comprise one or more fasteners 37 for releasably fastening curtains 24A and 24B to a respective close-out panel 26 and/or for releasably fastening curtains 24A and 24B to each other. The use of fasteners 37 may also improve the visual separation provided by divider by permitting portions of divider 12 to be releasably fastened together. In some embodiments, fasteners 37 may be releasable by the exertion of a pulling force between adjacent portions of divider 12 that are releasably fastened together. For example, fasteners 37 may comprise magnets and/or snaps.

When luggage bin 20 is closed, curtain 24A may provide a facing (e.g., front and/or back) surface that is substantially smooth (e.g., unpleated) and which may be suitable for the display of branding colors and/or logo(s) of an operator of the mobile platform. Curtain 24B may have facing surface 24B-1 extending across aisle 16 and which may be pleated. Curtain 24B may have facing surface 24B-2 outboard of facing surface 24B-1 and extending adjacent face 22 of luggage bin 20. Facing surface 24B-2 may also be substantially smooth (e.g., unpleated) and may be suitable for the display of branding colors and/or logo(s) of an operator of the mobile platform.

FIGS. 4A and 4B respectively show divider 12 of FIG. 3 in a first configuration where luggage bins 20 are closed, and, in a second configuration where luggage bins 20 are open. The first configuration shown in FIG. 4A may correspond to an in-flight or in-transit configuration and the second configuration shown in FIG. 4B may correspond to a boarding or unboarding configuration where curtain 24B is also opened to permit the mobility of passengers and flight crew in aisle 16. As explained above, FIG. 4A shows curtains 24A and 24B as being drawn and providing visual separation between zones 10A, 10B (shown in FIG. 1). In reference to curtain 24A, as luggage bin 20 is opened, face 22 of luggage bin 20 moves downwardly and pushes against edge 30 of curtain 24A to thereby cause curtain to be deformed in a non-destructive manner. In FIG. 4B, outboard portion 34 of curtain 24A is shown as being elastically attached to close-out panel 26 and consequently outboard portion 34 of curtain 24A is displaced in an inboard direction to accommodate the movement of luggage bin 20 while inboard portion 32 of curtain 24A remains relatively firmly attached to aisle header 36. As luggage bin 20 is moved from its open position to its closed position, the elastic attachment of curtain 24A to close-out panel 26 urges curtain 24A toward its original shape corresponding to when luggage bin 20 is in its closed position.

In various embodiments, curtain 24A may be mounted inside passenger cabin 10 and extend into space S allotted for movement of luggage bin 20 where curtain 24A is deformable from a first shape (shown in FIG. 4A) where luggage bin 20 is in its closed position to a second shape (shown in FIG. 4B) where the movement of luggage bin 20 is accommodated by curtain 24A. Curtain 24A may be biased toward its first shape via a suitable biasing member such as a piece of elastic fabric incorporated into the structure of curtain 24A and and/or an elastic connecting member via which curtain 24A is elastically attached to a fixed structure inside passenger cabin 10.

Figure 5:
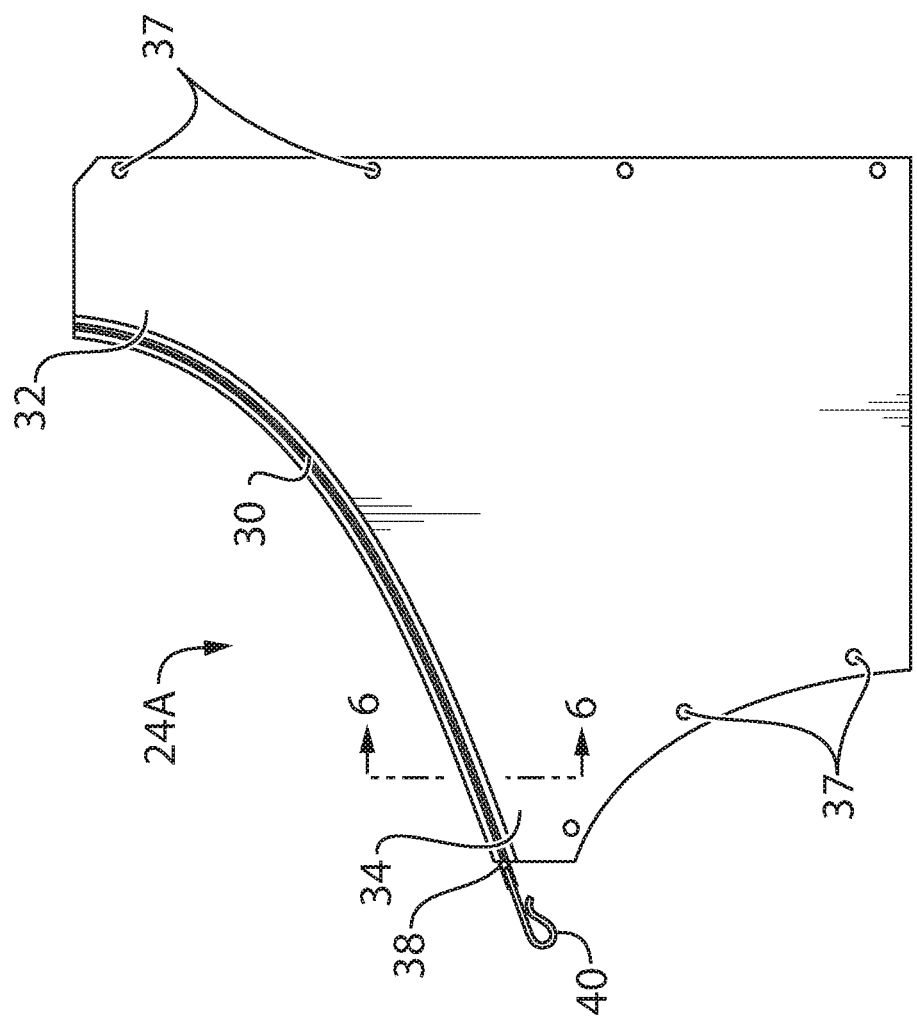
FIG. 5 is a front plan view of a curtain of the divider of FIG. 3 together with a biasing member for attaching the curtain to a structure inside the passenger cabin.

FIG. 5 is a front plan view of curtain 24A of divider 12 together with an exemplary biasing member 38 for elastically attaching curtain 24A to other structure inside passenger cabin 10 such as close-out panel 26 for example. Biasing member 38 may comprise an elastic strap attached to curtain 24A and that is extendable outwardly from curtain 24A. Biasing member 38 may be attached to hook 40 or other fastening means for attachment to other structure inside of passenger cabin 10.

Figure 6:
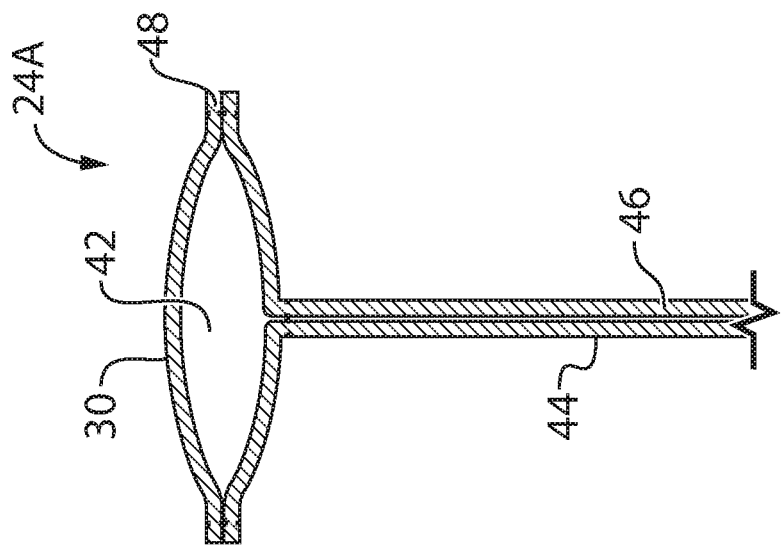
FIG. 6 is a partial cross-section view of the curtain of FIG. 5 taken along line 6-6 in FIG. 5 and showing a channel formed in the curtain.

FIG. 6 is a partial cross-sectional view of curtain 24A taken along line 6-6 in FIG. 5 where biasing member 38 has been omitted for the sake of clarity. Curtain 24A may comprise channel 42 formed along edge 30 of curtain 24A. Channel 42 may extend along some or the entirety of edge 30. Biasing member 38 may extend into channel 42 and may extend along some or the entirety of channel 42. As explained above curtain 24A may have a dual-ply construction and channel 42 may be defined by the separation of plies 44 and 46 of curtain 24A and the use of covering strip 48 sewn to plies 44 and 46 and extending along curtain 24A to define edge 30.

Figure 7:
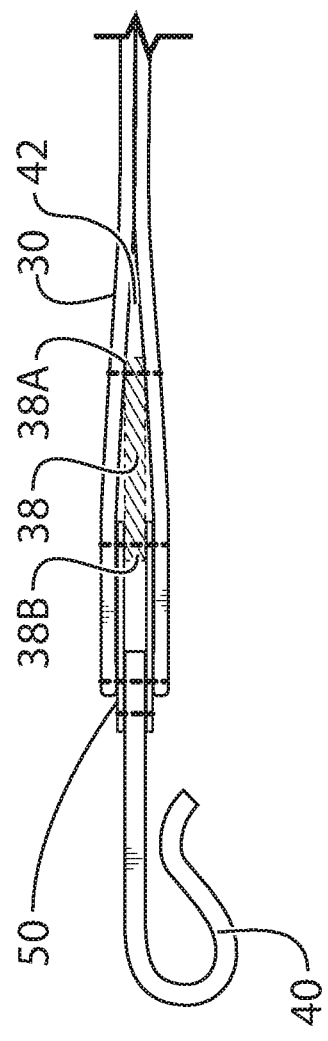
FIG. 7 is a schematic view of the biasing member being disposed inside the channel of FIG. 6.

FIG. 7 is a schematic view of biasing member 38 being disposed inside of channel 42 of curtain 24A. Biasing member 38 may be housed in its entirety into channel 42 where a first (e.g., inboard) end 38A may be attached (e.g., sewn) to curtain 24A and a second (e.g., outboard) end 38B may be free to elastically move relative to curtain 24A. Second end 38B of biasing member 38 may be attached to hook 40 via connecting member 50. Connecting member 50 may comprise one or more pieces of relatively non-elastic material that may be attached (e.g., sewn) to biasing member 38 and also attached hook 40 using a suitable adhesive or fastener. Alternatively, biasing member 38 may be directly attached to hook 40 without the use of intermediate connecting member 50.

Figure 8:
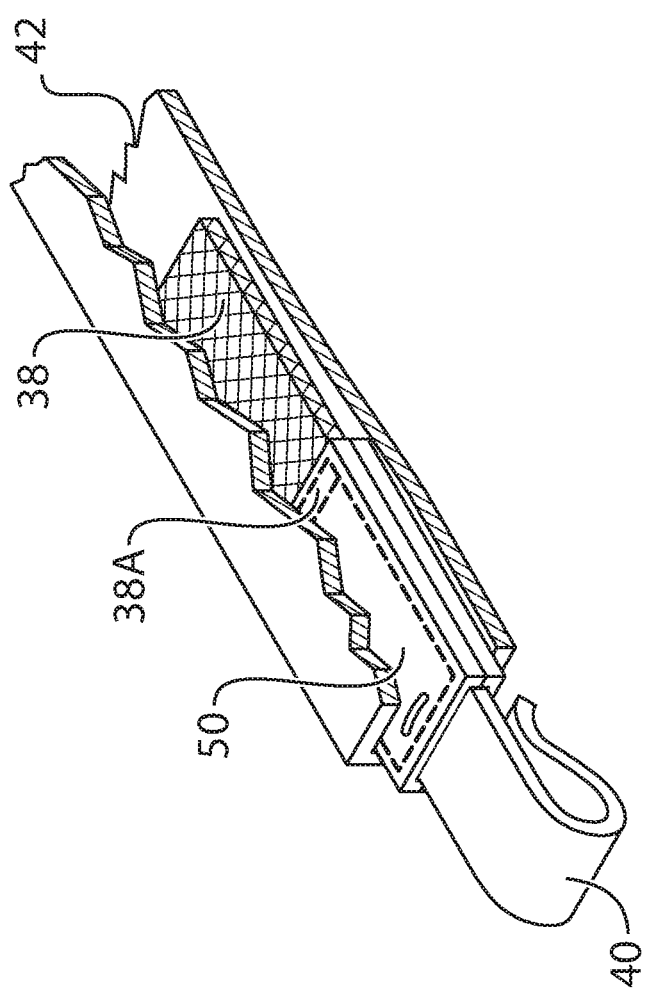
FIG. 8 is a perspective view of the biasing member of FIG. 7 being disposed inside the channel of FIG. 6.

FIG. 8 is a perspective view of biasing member 38 being disposed inside of channel 42 of curtain 24A.

In some embodiments, biasing member 38 may serve to bias edge 30 against face 22 of luggage bin 20 and simultaneously urge curtain 24A toward a shape/configuration corresponding to when luggage bin 20 is closed. In some embodiments, the use of biasing member 38 may provide some resistance to the opening movement of luggage bin 20, however, such resistance may not be so significant as to significantly affect the operation of luggage bin 20.

Figure 9:
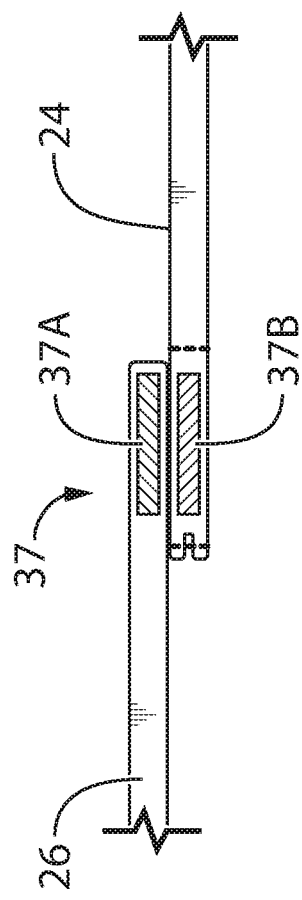
FIG. 9 is a schematic representation of an exemplary fastener for releasably fastening the curtains of FIG. 3 to respective close-out panels.
Figure 10:
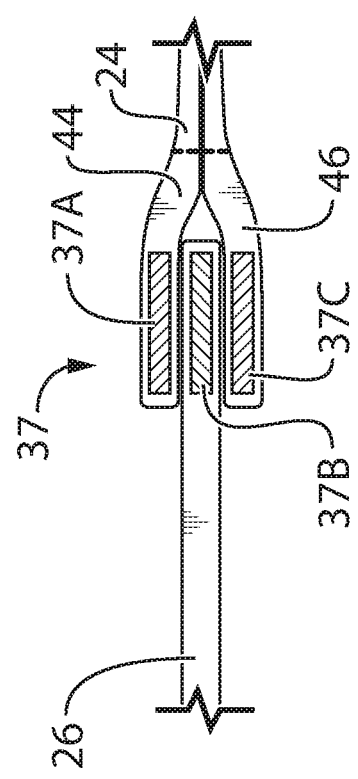
FIG. 10 is a schematic representation of another exemplary fastener for releasably fastening the curtains of FIG. 3 to respective close-out panels.

FIGS. 9 and 10 are schematic representations of exemplary fasteners 37 for releasably fastening curtains 24A and/or 24B to respective close-out panels 26. FIG. 9 shows an example where a single side of curtain 24 overlaps and interfaces with a single side of close-out panel 26. Alternatively, FIG. 10 shows an example where curtain 24 is split into two plies 44 and 46 where each ply 44, 46 overlaps and interfaces with a different side of close-out panel 26. As explained above, fasteners 37 may be configured for a mechanical (e.g., snap) or a magnetic engagement between curtain 24 and close-out panel 26. Accordingly, fasteners 37 may comprise one or more counterparts 37A, 37B and 37C. For example, in reference to FIG. 9, one of counterparts 37A and 37B may comprise a magnet and the other one of counterparts 37A and 37B may comprise a magnetic material such as steel or some other (e.g., ferromagnetic) material that may be attracted to the magnet. In reference to FIG. 10, one or more of counterparts 37A, 37B and 37C may comprise a magnet and the other one or more of counterparts 37A, 37B and 37C may comprise a magnetic material such as steel or some other material that may be attracted to the magnet(s).

In some embodiments, fasteners 37 may be releasable in a non-destructive manner by exerting a pulling force between curtain 24 and close-out panel 26. Accordingly, the resilient deformation of curtain 24 as illustrated in FIG. 4A may cause such pulling force to be exerted so as to cause fasteners 37 to be released. In some embodiments where magnets are used in fasteners 37, the re-engagement of fasteners 37 may be achieved automatically as luggage bins 20 are closed and curtain 24 returns to its original shape.

Figure 11A:
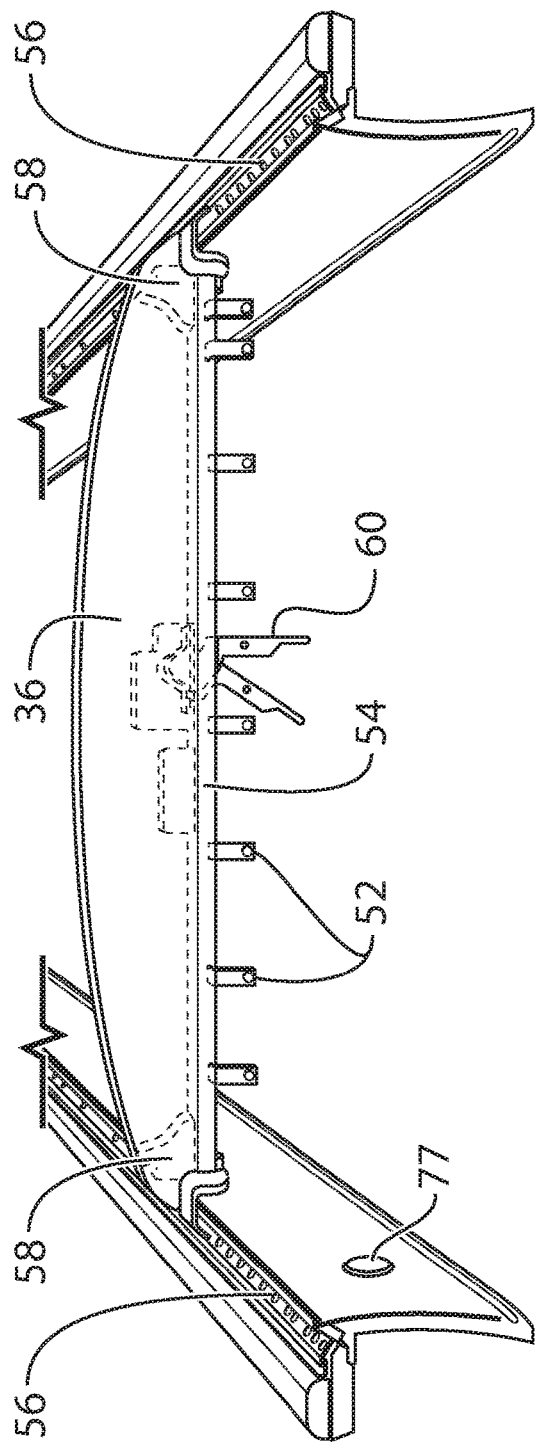
FIGS. 11A and 11B respectively show perspective views of a movable aisle header, to which the curtains of FIG. 3 may be attached, in an unlocked configuration and in a locked configuration.
Figure 11B:
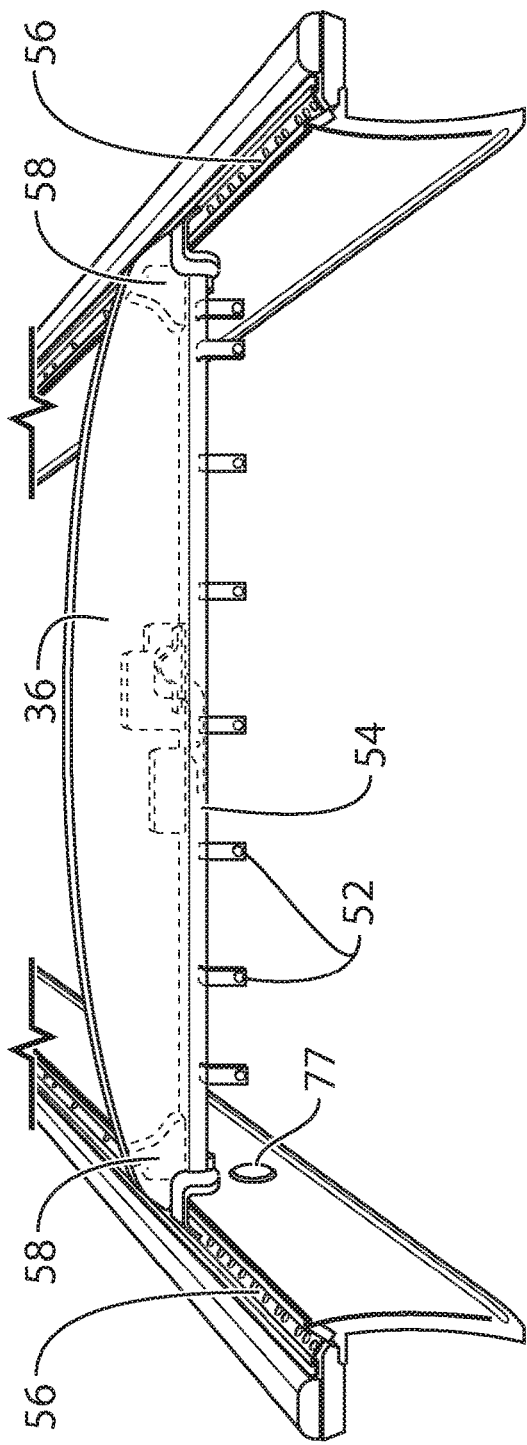

FIGS. 11A and 11B show perspective views of an exemplary movable (e.g., slidable) aisle header 36 to which curtain 24 may be attached via curtain connectors (e.g., hooks) 52. Curtain connectors 52 may be movable along curtain track 54 (e.g., rod) so as to permit lateral movement of curtain 24 for the purpose of opening and closing curtain 24 across aisle 16.

Aisle header 36 may be movable along aisle 16 via one or more tracks 56. For example, each end of aisle header 16 may be engaged in one of tracks 56 extending along aisle 16 and which may be disposed in an upper portion of passenger cabin 16. For example, parallel tracks 56 may be disposed above luggage bins 20 and on each side of aisle 16. Aisle header 36 may be unlockable to permit (e.g., sliding) movement of aisle header 36 along tracks 56, and, lockable at a desired position along tracks 56. For example, one or more suitable locking mechanisms 58 may be provided to permit the engagement (e.g., locking) of aisle header 36 with one or both of tracks 56. Such locking mechanisms 58 may be actuatable via handle 60 and may comprise a suitable brake mechanism of known or other type. FIG. 11A shows handle 60 in an unlocked position to thereby permit movement of aisle header 36 along tracks 56 and FIG. 11B shows handle 60 in a locked position to thereby prevent movement of aisle header 36 along tracks 56. The use of locking mechanism 58 activatable via handle 60 may facilitate the movement of divider 12 along aisle 16 without the use of tools and without the need for maintenance personnel in order to change the sizes of zones 10A and 10B (shown in FIG. 1). Accordingly, the moving of divider 12 may be carried out by the flight crew between flights for example in response to the passenger load.

FIGS. 12A and 12B respectively show perspective front and rear views of an exemplary close-out panel 26. Close-out panel 26 may extend at least partially between passenger service unit 28 disposed above passenger seat 14 and passenger seat 14. Close-out panel 26 may comprises first (e.g., upper) panel portion 26A and second (e.g., lower) panel portion 26B. First panel portion 26A and second panel portion 26B may be pivotally connected to each other via hinge 62. Accordingly, second panel portion 26B may be pivotable relative to first panel portion 26A.

Close-out panel 26 may comprise frame 64 defining a viewing window 66 through close-out panel 26. Viewing window 66 may permit a passenger occupying a seat 14 located immediately behind close-out panel 26 to still be able to view display area 68 (e.g., overhead video display) of passenger service unit 28 in which ordinance signs and/or other information may be visually communicated to that passenger.

Figure 13A:
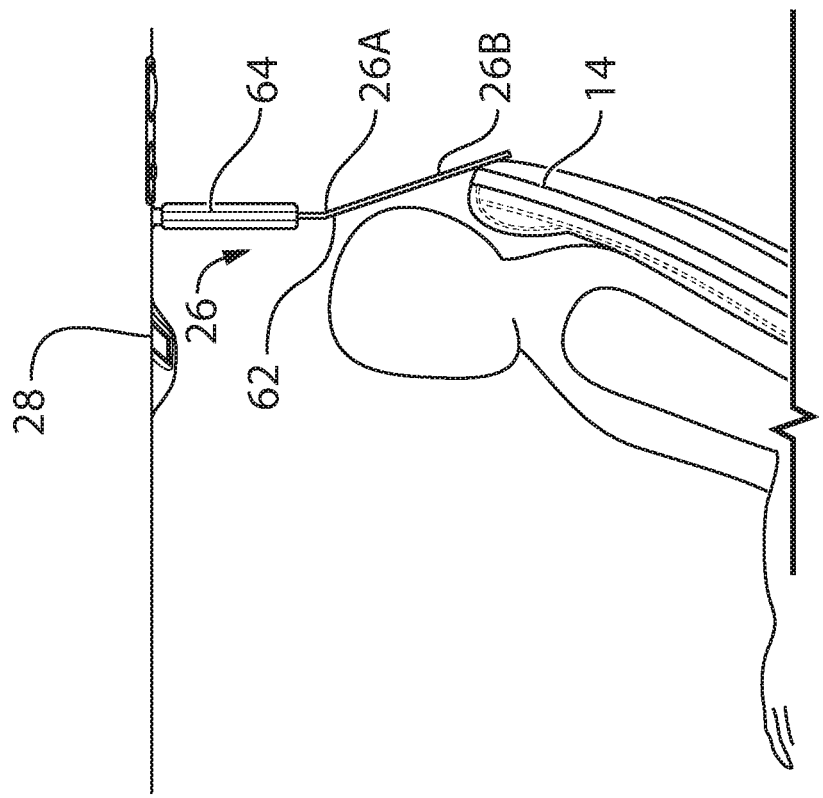
FIGS. 13A and 13B respectively show side elevation views of the close-out panel of FIGS. 12A and 12B in a undeflected configuration and in a deflected configuration.
Figure 13B:
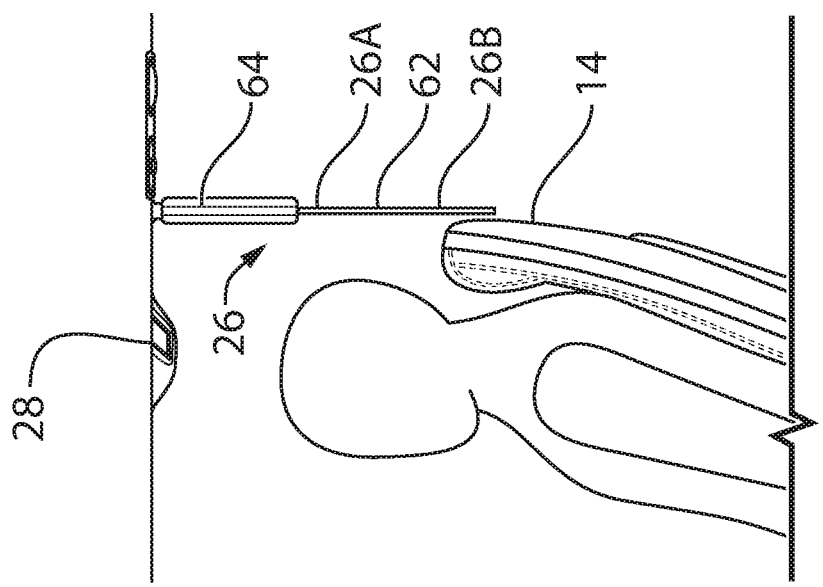

FIGS. 13A and 13B respectively show side elevation views of close-out panel 26 in an undeflected configuration and in a deflected configuration due to the reclining of passenger seat 14. Close-out panel 26 may extend downwardly beyond the top of the backrests of seats 14 so that second panel portion 26B may engage the back rest of passenger seat(s) 14 and that movement of passenger seat 14 may cause movement of second panel portion 26B relative to first panel portion 26A. Frame 64 may be relatively rigid and panel portions 26A and 26B may be relatively semi-rigid. Since first panel portion 26A is attached to frame 64, frame 64 may provide some stiffening of first panel portion 26A. However, the presence of hinge 62 between first panel portion 26A and second panel portion 26B may permit second panel portion 26B to pivot about hinge 62 as the back rest of passenger seat 14 engages and pushes against second panel portion 26B as the back rest of passenger seat 14 is reclined. FIG. 13A shows the backrest of passenger seat 14 being in an upright position which corresponds to second panel portion 26B being in a substantially vertical orientation. FIG. 13B shows the backrest of passenger seat 14 being in a reclined position which corresponds to second panel portion 26B being rotated about hinge 62 and being non-parallel to first panel portion 26A to accommodate the reclining of the backrest of passenger seat 14.

Figure 14:
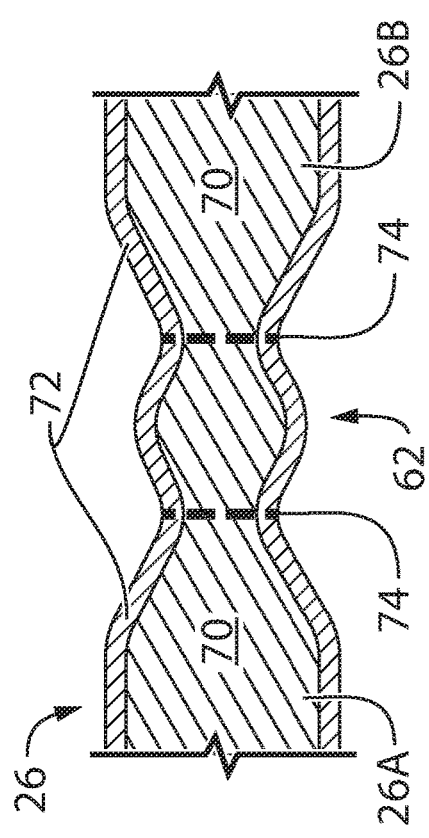
FIG. 14 is a cross-sectional view of the close-out panel of FIGS. 12A and 12B taken along line 14-14 in FIG. 12B showing the construction of an exemplary hinge in the close-out panel.

FIG. 14 is a cross-sectional view of close-out panel 26 taken along line 14-14 in FIG. 12B to show an exemplary construction of close-out panel 26 and an exemplary implementation of hinge 62. In some embodiments, each of first panel portion 26A and second panel portion 26B may comprise core 70 and decorative cover 72, which may comprise a suitable fabric (e.g., natural or synthetic), leather and/or vinyl for example. In some embodiments, core 70 may comprise a suitable foam material that results in close-out panel 26 being light-weight and semi-rigid. In some embodiments, core 70 could be made of one or more other materials such as cardboard or cork. Foam core 70 may comprise a single piece that extends continuously from first panel portion 26A to second panel portion 26B. Accordingly, first panel portion 26A and second panel portion 26B may share a common core 70. Likewise, decorative cover 72 may also extend continuously from first panel portion 26A to second panel portion 26B. In some embodiments, hinge 62 may be defined by one or more stitches 74 applied through the thickness of close-out panel 26. The application of stitches 74 may form a region of close-out panel 26 with a reduced thickness and may form a region at which close-out panel 26 may be more likely to bend (e.g., pivot) when a bending moment is applied to close-out panel 26 in a plane that is substantially normal to a hinge line defined by hinge 62.

Figure 15:
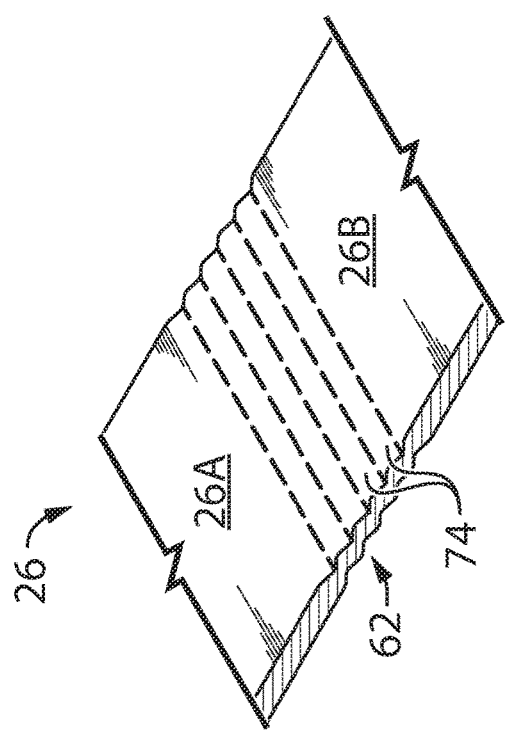
FIG. 15 is a front elevation view of the close-out panel of FIGS. 12A and 12B at an exemplary hinge.

FIG. 15 is a front elevation view of the close-out panel 26 at hinge 62. Hinge 62 may be defined by one or more lines of stitching 74 to form a hinge line about which close-out panel 26 is more likely to bend and permit second panel portion 26B to pivot relative to first panel portion 26A due to the reclining of the backrest of passenger seat 14 as illustrated in FIG. 13B.

Figure 16:
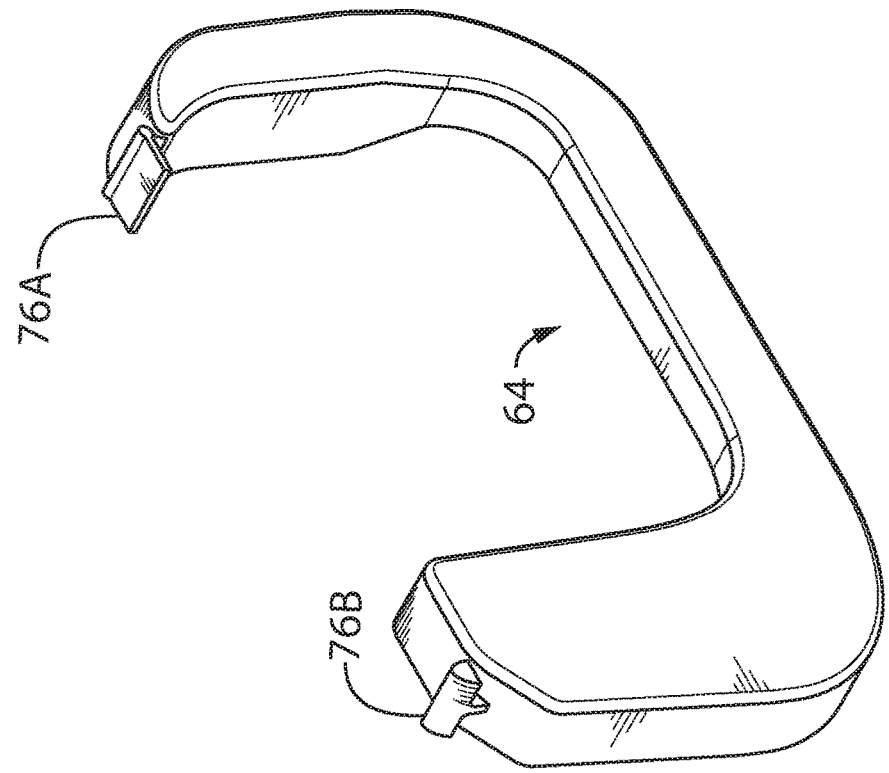
FIG. 16 is a perspective view of a frame of the close-out panel of FIGS. 12A and 12B shown in isolation.

FIG. 16 is a perspective view of an exemplary frame 64 of close-out panel 26 shown in isolation. Frame 64 may have a relatively rigid construction and may comprise a suitable metallic or polymeric material suitable for use in passenger cabin interiors. In some embodiments, frame 64 may be made of an aluminum alloy. Frame 64 may comprise one or more clips 76A and 76B or other means for removably mounting close-out panel 26 inside passenger cabin 10. The relatively rigid construction of frame 64 may permit close-out panel 26 to be rigidly attached to (e.g., fixed) structure inside of passenger cabin 10 such as passenger service unit 28. The relatively rigid construction and shape of frame 64 may also provide some stiffening of part (e.g., upper panel portion 26A) of close-out panel 26. In some embodiments, close-out panel 26 may be configured to be attached to and detached from some fixed structure inside passenger cabin 10 without the use of tools and without the need for maintenance personnel in order to change the sizes of zones 10A and 10B (shown in FIG. 1). Accordingly, the moving of divider 12 may be carried out by the flight crew between flights for example in response to the passenger load. In some embodiments, clips 76A and 76B may permit the attachment of frame 64 and hence of close-out panel 26 to passenger service unit 28 without the use of tools. For example, in some embodiments, one or both of clips 76A and 76B may be spring loaded in order to facilitate mounting of frame 64 inside passenger cabin 10 manually by the flight crew without the use of tools.

Figure 17:
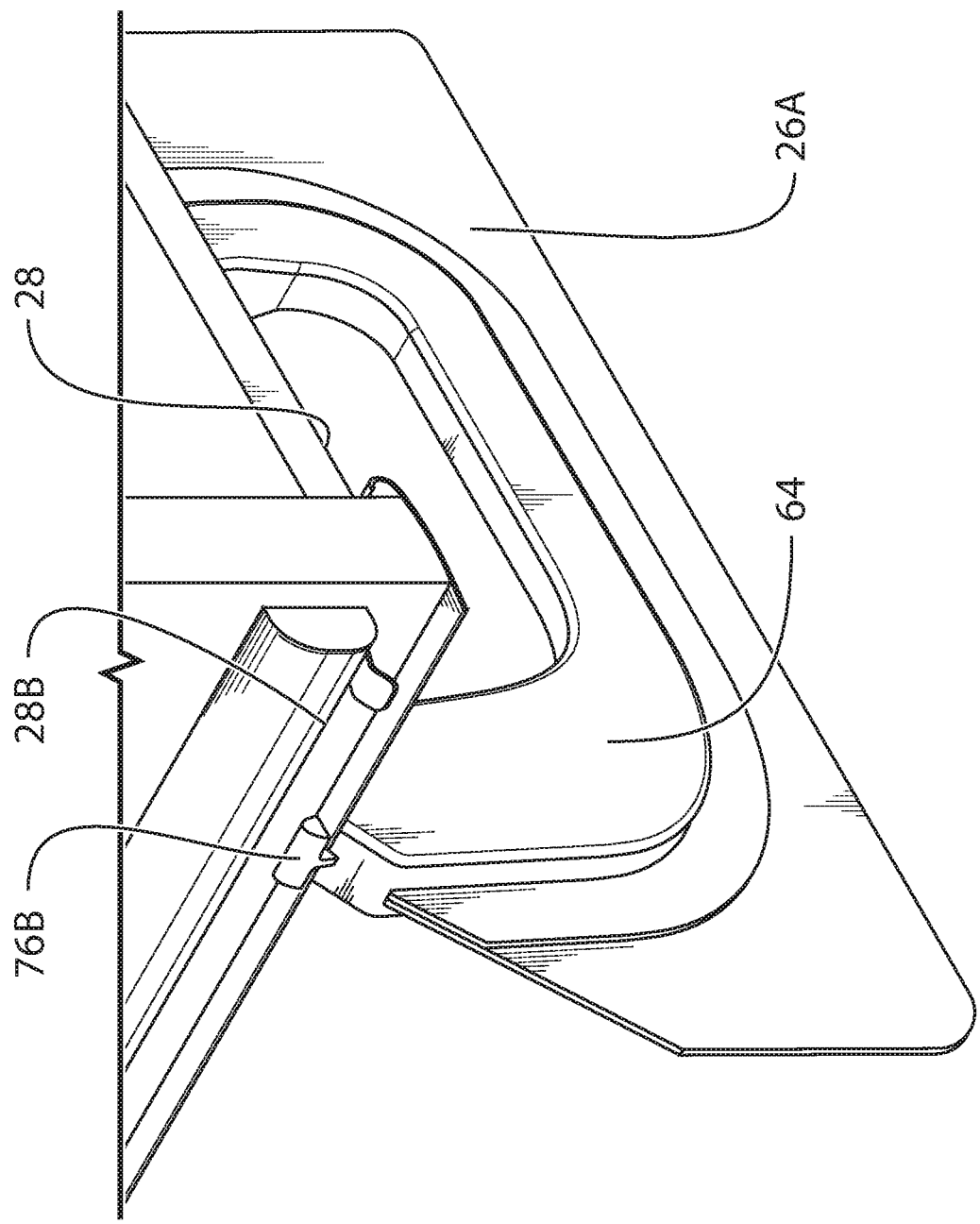
FIG. 17 is a perspective view of a first side of the frame of FIG. 16 removably attached to a passenger service unit.

FIG. 17 is a perspective view of a first side of frame 64 removably attached to passenger service unit 28 via clip 76B. Clip 76B may be configured to interface with receptacle 28B formed in passenger service unit 28. In some embodiments, receptacle 28B may be a rail of passenger service unit 28.

Figure 18:
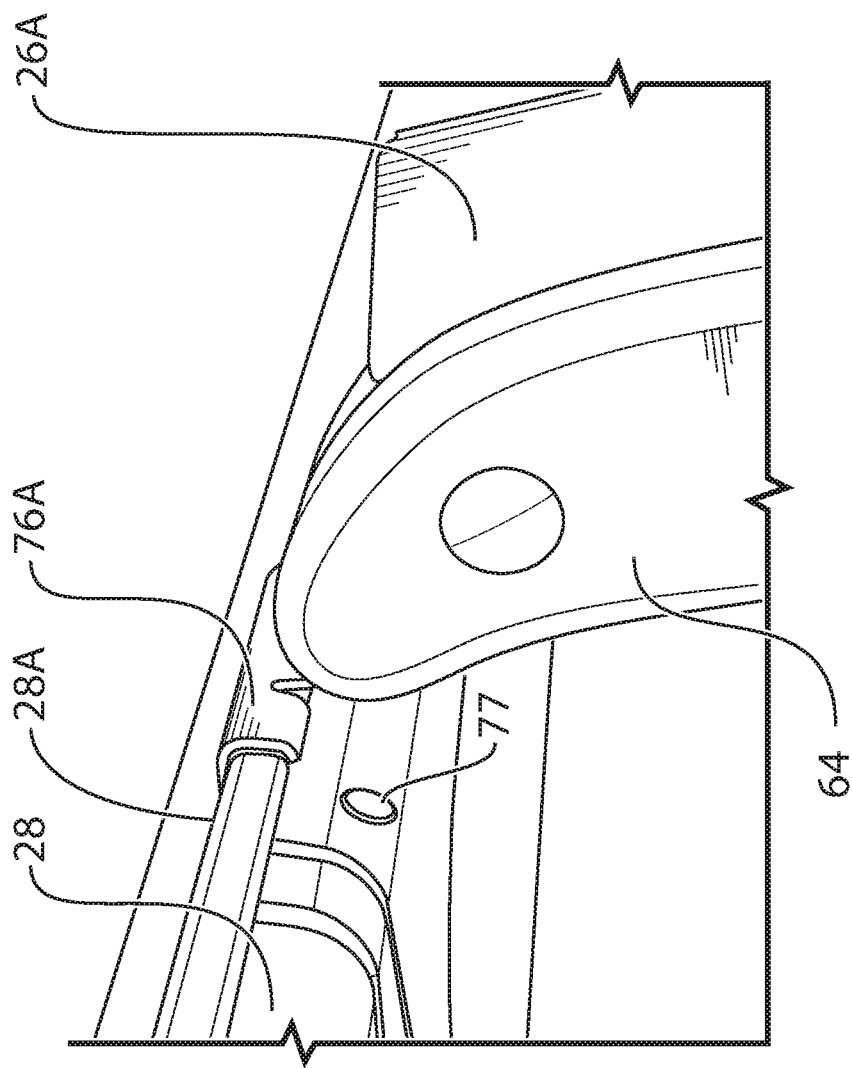
FIG. 18 is a perspective view of a second side of the frame of FIG. 16 removably attached to a passenger service unit.

FIG. 18 is a perspective view of a second side of frame 64 removably attached to a passenger service unit 28 via clip 76A. Clip 76A may be configured to interface with receptacle 28A (e.g., rail) formed in passenger service unit 28. Passenger cabin 10 may comprise one or more indicators 77 configured to indicate to the flight crew where divider 12 should be positioned. For example, indicator(s) 77 may indicate at which row of passenger seats 14 divider 12 should be repositioned based on passenger load. Alternatively or in addition, indicator(s) 77 may indicate the precise desired location of divider 12 along receptacles 28A, 28B (rails) of passenger service unit 28 and/or the precise desired location of divider 12 along tracks 56 of aisle header 36. Indicator(s) 77 may be static or may be dynamic and controlled via an avionics system or a cabin management system associated with the mobile platform. Each indicator 77 may be in the form of an indicator light, an icon or a static symbol/sign for example. In various embodiments, indicator(s) 77 may be positioned at any suitable location(s) that is visible to a member of the flight crew repositioning close-out panel 26 and/or repositioning aisle header 36 (see FIGS. 11A, 11B and 18). In some embodiments, indicator(s) 77 may be part of passenger service unit 28.

Figure 19:
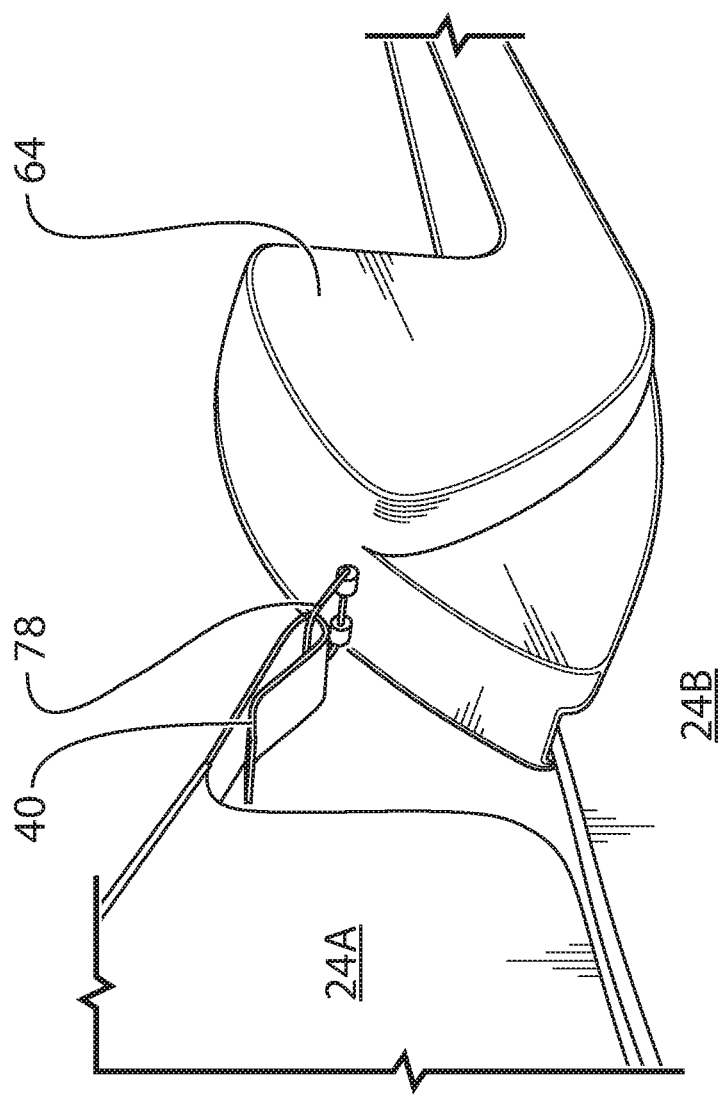
FIG. 19 is a perspective view of part of the frame of FIG. 16 comprising an exemplary interface for coupling the biasing member of FIG. 7 thereto.

FIG. 19 is a perspective view of a part of frame 64 of close-out panel 26 comprising an interface 78 for attaching hook 40, which is in turn attached to biasing member 38 (see FIGS. 7 and 8), to frame 64. Interface 78 may be disposed on an inboard side of frame 64. In some embodiments, interface 78 may comprise a loop or ring configured to permit the coupling of hook 40 thereto.

FIGS. 20-24 are front elevation views of various embodiments of curtains 24 which may be suitable for use with divider 12 disclosed herein. Aspects of curtains 24 described above may also apply to curtains 24 of FIGS. 20-24 and are not repeated below. Like elements are labelled using like reference numerals.

FIG. 20 shows a two-piece curtain arrangement comprising curtains 24A and 24B. Curtains 24A and 24B may have a curved interface therebetween instead of a substantially linear interface as shown in FIG. 3.

FIG. 21 shows a two-piece curtain arrangement comprising curtains 24A and 24B with a substantially linear interface therebetween but where the positions of curtains 24A and 24B have been horizontally flipped in comparison with the arrangement of FIG. 3 so that curtain 24A is disposed to the right and curtain 24B is disposed to the left.

Figure 22:
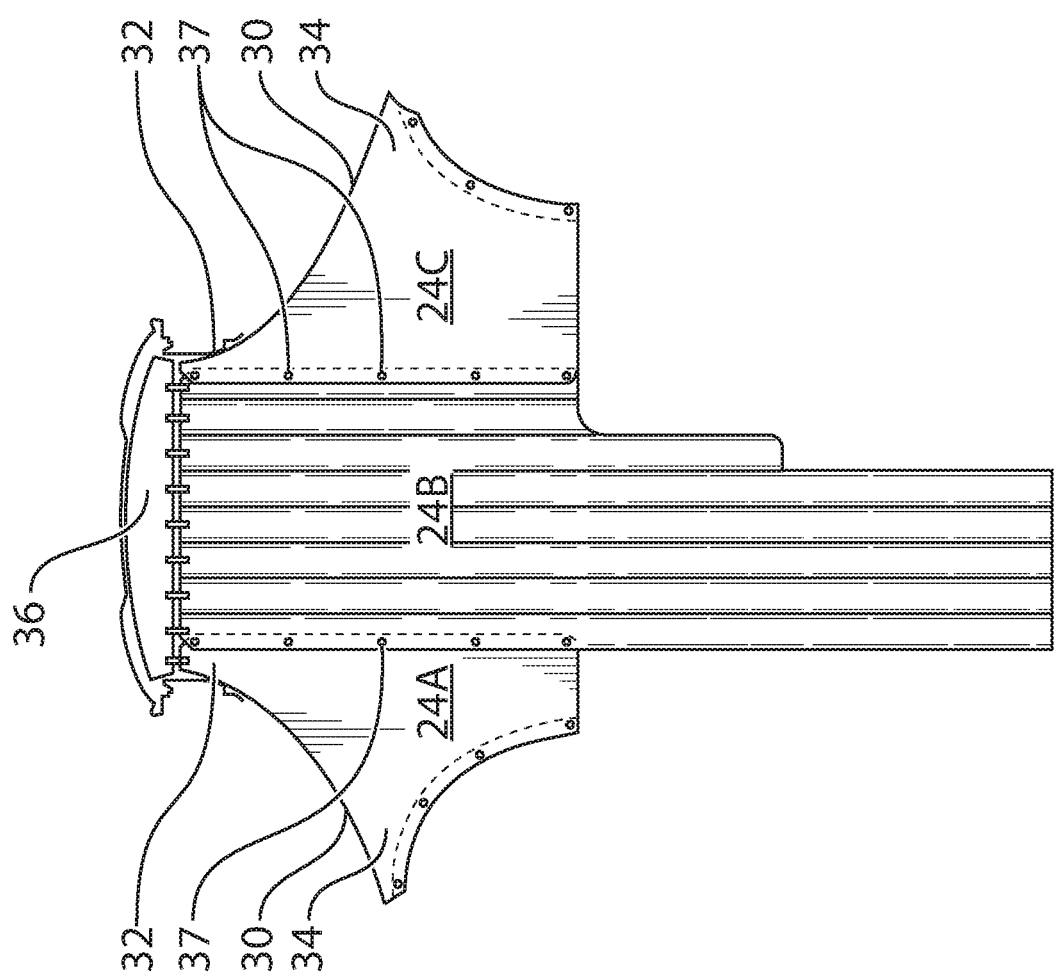

FIG. 22 shows a three-piece curtain arrangement comprising curtains 24A, 24B and 24C with substantially linear interfaces therebetween. Curtains 24A and 24C may have respective facing surfaces that are substantially smooth (e.g., unpleated) and which may be suitable for the display of branding colors and/or logo(s) of an operator of the mobile platform. Curtain 24B may have a lacing surface extending across aisle 16 and which may be pleated.

FIG. 23 shows a four-piece curtain arrangement comprising curtains 24A, 24B, 24C and 24D with substantially linear interfaces therebetween. Curtains 24A and 24D may have respective facing surfaces that are substantially smooth (e.g., unpleated) and which may be suitable for the display of branding colors and/or logo(s) of an operator of the mobile platform. Curtains 24B and 24C may have a facing surface which may be pleated.

FIG. 24 shows a four-piece curtain arrangement comprising curtains 24A, 24B, 24C and 24D with substantially linear interfaces between curtains 24B and 240, and, between curtain 24C and 24D. Curtains 24A and 24B may have a curved interface therebetween. Curtains 24A and 24D may have respective facing surfaces that are substantially smooth (e.g., unpleated) and which may be suitable for the display of branding colors and/or logo(s) of an operator of the mobile platform. Curtains 24B and 240 may have a facing surface which may be pleated.

Figure 25B:
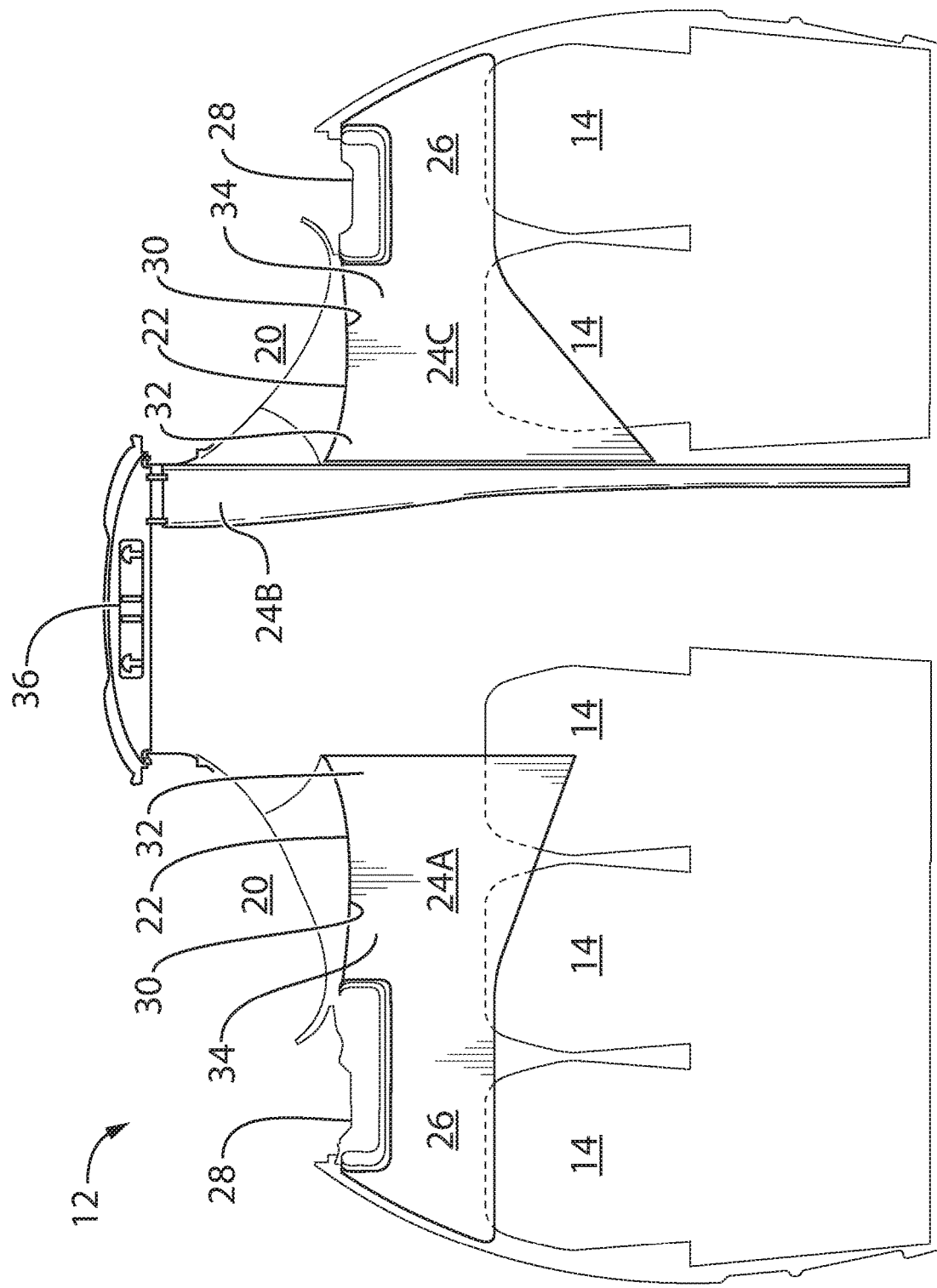

FIGS. 25A and 25B respectively show another exemplary class divider 12 in a first configuration where luggage bins 20 are closed and in a second configuration where luggage bins 20 are open. Aspects of divider 12 described above may also apply to divider 12 of FIGS. 25A and 25B and are not repeated below, like elements are labelled using like reference numerals. Curtains 24A and 24C shown in FIGS. 25A and 25B may be resiliently deformable to accommodate movement of respective luggage bins 20. For example, inboard portions 32 of curtains 24A and 24C may be attached (e.g., substantially non-elastically) to face 22 of respective luggage bins 20 so that inboard portions 32 of curtains 24A and 24C may displaced downwardly (e.g., droop) by following the movement of face 22 to accommodate the opening movement of luggage bins 20. As luggage bins 20 are closed, inboard portions 32 of curtains 24A and 240 may return to their respective original shape/position by moving upwardly by again following the movement of face 22. Outboard portions 34 of curtains 24A and 24C may be attached (e.g., substantially non-elastically) to structure such as close-out panel 26 inside passenger cabin 10.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the dividers, curtains and close-out panels disclosed and shown herein may comprise a specific number of elements/components, the dividers, curtains and close-out panels could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A passenger cabin of a mobile platform, the passenger cabin comprising:
   a pivoting luggage bin disposed inside the passenger cabin and above a passenger seat, the pivoting luggage bin being movable from a closed position to an open position through an allotted space inside the passenger cabin; and
   a divider at least partially separating two zones inside the passenger cabin, the divider comprising a curtain mounted inside the passenger cabin and extending into the space allotted for movement of the pivoting luggage bin, the curtain being resiliently deformable to accommodate the movement of the pivoting luggage bin,
   wherein the curtain comprises an inboard portion attached to an inboard structure inside the cabin and an outboard portion elastically attached to an outboard structure inside the cabin.

2. The passenger cabin as defined in claim 1, comprising an elastic strap attaching the curtain to the outboard structure inside the cabin.

3. The passenger cabin as defined in claim 2, wherein the aisle header is configured to be movable along an aisle of the passenger cabin.

4. The passenger cabin as defined in claim 1, wherein the inboard structure comprises an aisle header.

5. The passenger cabin as defined in claim 1, wherein an edge of the curtain is biased against a face of the pivoting luggage bin.

6. The passenger cabin as defined in claim 1, wherein:
   an edge of the curtain is biased against a face of the pivoting luggage bin;
   the curtain comprises a channel extending along the edge of the curtain: and
   an elastic strap extends into the channel.

7. The passenger cabin as defined in claim 6, wherein:
   a first end of the elastic strap is attached to the curtain; and
   a second end of the elastic strap is elastically movable relative to the first end and is attached to a structure inside the cabin.

8. The passenger cabin as defined in claim 1, wherein the divider comprises a close-out panel extending at least partially between a passenger service unit disposed above the passenger seat and the passenger seat, the close-out panel comprising a frame defining a viewing window through the close-out panel.

9. The passenger cabin as defined in claim 8, wherein the curtain is elastically attached to the frame of the close-out panel.

10. The passenger cabin as defined in claim 8, wherein the close-out panel comprises a first panel portion and a second panel portion, the second panel portion being pivotable relative to the first panel portion.

11. The passenger cabin as defined in claim 10, wherein the second panel portion is configured to engage the passenger seat so that movement of the passenger seat causes movement of the second panel portion relative to the first panel portion.

12. The passenger cabin as defined in claim 10, wherein each of the first panel portion and the second panel portion comprises a core and a cover; and one or more stitches in the close-out panel define a hinge between the first panel portion and the second panel portion.

13. The passenger cabin as defined in claim 12, wherein the first panel portion and the second panel portion comprise a common foam core.

14. The passenger cabin as defined in claim 8, comprising a fastener for releasably fastening the curtain to the close-out panel when the pivoting bin is closed.

15. The passenger cabin as defined in claim 14, wherein the fastener comprises a magnet.

16. The passenger cabin as defined in claim 8, wherein the close-out panel is configured to be attached to and detached from the passenger service unit without the use of tools.

17. An aircraft comprising the passenger cabin defined in claim 1.

18. A divider for at least partially separating two zones inside a passenger cabin of a mobile platform where the passenger cabin comprises a pivoting luggage bin disposed inside the passenger cabin and above a passenger seat, the pivoting luggage bin being movable from a closed position to an open position through an allotted space inside the passenger cabin, the divider comprising:
   a curtain configured to be mounted inside the passenger cabin and to extend into the space allotted for movement of the pivoting luggage bin, the curtain comprising an edge configured to be biased against a face of the pivoting luggage bin; and
   a biasing member attached to the curtain and configured to facilitate resilient deformation of the curtain to accommodate the movement of the pivoting luggage bin,
   wherein the curtain comprises an inboard portion for attachment to an inboard structure inside the cabin and an outboard portion for elastic attachment to an outboard structure inside the cabin via the biasing member.

19. The divider as defined in claim 18, wherein the biasing member comprises an elastic strap.

20. The divider as defined in claim 19, wherein:
   the curtain comprises a channel extending along the edge of the curtain; and
   the elastic strap extends into the channel.

21. The divider as defined in claim 20, wherein:
   a first end of the elastic strap is attached to the curtain; and
   a second end of the elastic strap is elastically movable relative to the first end.

22. The divider as defined in claim 18, wherein the divider comprises a close-out panel configured to extend at least partially between a passenger service unit disposed above the passenger seat and the passenger seat, the close-out panel comprising a frame defining a viewing window through the close-out panel.

23. The divider as defined in claim 22, comprising an interface for attaching the biasing member to the frame of the close-out panel.

24. The divider as defined in claim 22, wherein the close-out panel comprises a first panel portion and a second panel portion, the second panel portion being pivotally connected to the first panel portion.

25. The divider as defined in claim 24, wherein the second panel portion is configured to engage the passenger seat so that movement of the passenger seat causes movement of the second panel portion relative to the first panel portion.

26. The divider as defined in claim 24, wherein each of the first panel portion and the second panel portion comprises a core and a cover where one or more stitches applied to the close-out panel define a hinge between the first panel portion and the second panel portion.

27. The divider as defined in claim 26, wherein the first panel portion and the second panel portion comprise a common foam core.

28. The divider as defined in claim 22, comprising a fastener for releasably fastening the curtain to the close-out panel when the pivoting bin is closed.

29. The divider as defined in claim 28, wherein the fastener comprises a magnet.

30. An aircraft comprising the divider as defined in claim 18.

* * * * *